United States Patent
Marshall et al.

(10) Patent No.: US 9,606,215 B2
(45) Date of Patent: Mar. 28, 2017

(54) TERRESTRIAL POSITIONING SYSTEM CALIBRATION

(71) Applicant: QUALCOMM Incorporated, San Diego, CA (US)

(72) Inventors: Grant Alexander Marshall, Campbell, CA (US); Mark Leo Moeglein, Ashland, OR (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/952,861

(22) Filed: Nov. 25, 2015

(65) Prior Publication Data
US 2016/0077185 A1 Mar. 17, 2016

Related U.S. Application Data

(63) Continuation of application No. 14/173,717, filed on Feb. 5, 2014, now Pat. No. 9,237,417.
(Continued)

(51) Int. Cl.
  *H04W 24/00* (2009.01)
  *G01S 5/02* (2010.01)
  *H04W 4/02* (2009.01)

(52) U.S. Cl.
  CPC ............ *G01S 5/021* (2013.01); *G01S 5/0215* (2013.01); *G01S 5/0236* (2013.01);
  (Continued)

(58) Field of Classification Search
  USPC .... 455/404.2, 432.1–453, 456.1–456.3, 457, 455/513, 63.4, 561–562.1; 370/331–334
  See application file for complete search history.

(56) References Cited

U.S. PATENT DOCUMENTS

| 7,127,257 | B2 | 10/2006 | Riley et al. |
| 7,319,878 | B2 | 1/2008 | Sheynblat et al. |

(Continued)

FOREIGN PATENT DOCUMENTS

| CN | 101536366 A | 9/2009 |
| WO | 03058986 A2 | 7/2003 |
| WO | WO-2009142943 | 11/2009 |

OTHER PUBLICATIONS

International Search Report and Written Opinion—PCT/US2014/015048—ISA/EPO—Jun. 11, 2014.
(Continued)

*Primary Examiner* — Dai A Phuong
(74) *Attorney, Agent, or Firm* — Silicon Valley Patent Group LLP

(57) ABSTRACT

Embodiments disclosed aggregate a plurality of crowd-sourced measurement sets for antennas received from a plurality of Mobile Stations (MS) with a Base Station Almanac (BSA), based on a measurement location estimate and a measurement location uncertainty estimate associated with each measurement set. A map comprising a plurality of map layers may be obtained, where each map layer associates locations in the BSA with spatially variable Forward Link Calibration (FLC) values for the antenna derived from the updated BSA data, wherein each spatially variable FLC value is associated with a corresponding location in the updated BSA data. Map layers, which may also include multipath map and/or received signal strength layers, may be provided to MS' as location assistance data.

30 Claims, 15 Drawing Sheets

Related U.S. Application Data

(60) Provisional application No. 61/762,305, filed on Feb. 7, 2013, provisional application No. 61/807,662, filed on Apr. 2, 2013, provisional application No. 61/817,813, filed on Apr. 30, 2013, provisional application No. 61/838,866, filed on Jun. 24, 2013.

(52) U.S. Cl.
CPC .......... *G01S 5/0252* (2013.01); *G01S 5/0273* (2013.01); *H04W 4/02* (2013.01)

(56) References Cited

U.S. PATENT DOCUMENTS

| | | | |
|---|---|---|---|
| 7,659,850 B1 | 2/2010 | Hou et al. | |
| 7,822,427 B1 | 10/2010 | Hou | |
| 7,868,826 B1* | 1/2011 | Hou | G01S 5/021 342/451 |
| 8,009,519 B2 | 8/2011 | Jazra et al. | |
| 8,244,832 B1 | 8/2012 | McGuire | |
| 8,644,853 B2 | 2/2014 | Moeglein et al. | |
| 8,781,507 B2 | 7/2014 | Werner et al. | |
| 2003/0054832 A1 | 3/2003 | Stein | |
| 2003/0125044 A1* | 7/2003 | Deloach, Jr. | G01S 5/0205 455/456.1 |
| 2003/0125045 A1 | 7/2003 | Riley et al. | |
| 2003/0148761 A1 | 8/2003 | Gaal | |
| 2004/0002344 A1 | 1/2004 | Moeglein et al. | |
| 2005/0020309 A1 | 1/2005 | Moeglein et al. | |
| 2005/0227689 A1* | 10/2005 | Jewett | H04W 64/00 455/433 |
| 2006/0009235 A1* | 1/2006 | Sheynblat | G01S 5/0036 455/456.1 |
| 2006/0258369 A1 | 11/2006 | Burroughs et al. | |
| 2006/0267841 A1 | 11/2006 | Lee et al. | |
| 2008/0098903 A1 | 5/2008 | Hecker et al. | |
| 2008/0122685 A1 | 5/2008 | Vassilovski | |
| 2008/0132244 A1 | 6/2008 | Anderson | |
| 2008/0146247 A1 | 6/2008 | Soliman | |
| 2010/0093377 A1* | 4/2010 | Riley | G01S 5/0205 455/456.6 |
| 2010/0106745 A1 | 4/2010 | Cho et al. | |
| 2010/0178934 A1* | 7/2010 | Moeglein | G01S 19/12 455/456.1 |
| 2010/0195566 A1 | 8/2010 | Krishnamurthy et al. | |
| 2010/0331009 A1 | 12/2010 | Krishnamurthy et al. | |
| 2011/0103307 A1 | 5/2011 | Kim et al. | |
| 2011/0190004 A1 | 8/2011 | Tenny et al. | |
| 2012/0015667 A1 | 1/2012 | Woo et al. | |
| 2012/0021767 A1 | 1/2012 | Paulson et al. | |
| 2012/0052883 A1 | 3/2012 | Austin et al. | |
| 2012/0083288 A1 | 4/2012 | Siomina | |
| 2013/0045759 A1 | 2/2013 | Smith | |
| 2014/0221005 A1 | 8/2014 | Marshall et al. | |
| 2014/0295881 A1 | 10/2014 | Werner et al. | |
| 2015/0009066 A1* | 1/2015 | Werner | G01S 19/09 342/357.42 |

OTHER PUBLICATIONS

Li B., et al., "A Database Method to Mitigate the NLOS Error in Mobile Phone Positioning", Position, Location, and Navigation Symposium, 2006 IEEE/ ION Coronado, CA Apr. 25-27, 2006, Piscataway, NJ, USA, IEEE, XP010924857, DOI: 10.11 09/PLANS.2006.1650601 ISBN: 978-0-7803-9454-4, pp. 173-178.

\* cited by examiner

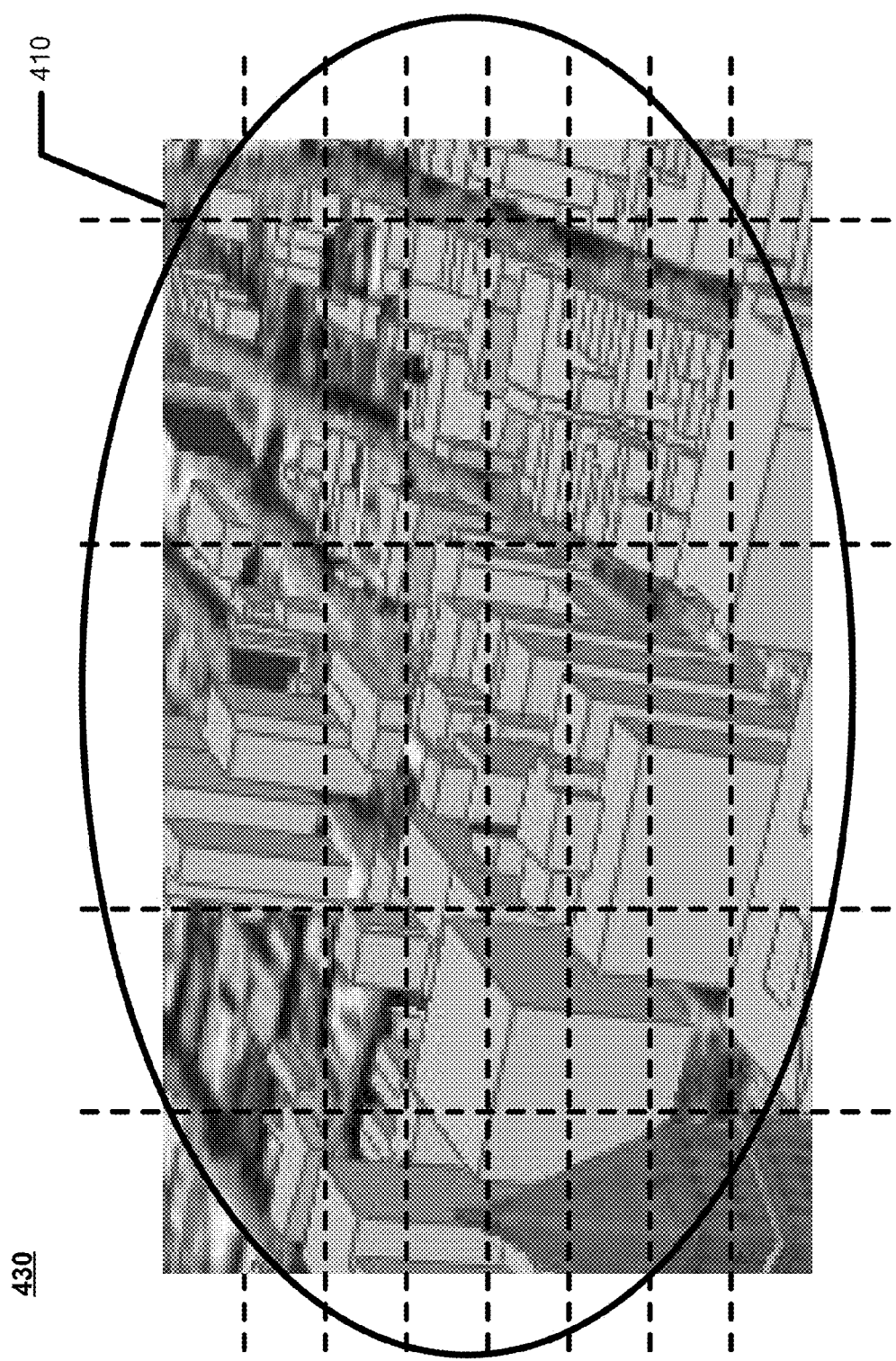

TERRESTRIAL POSITIONING SYSTEM CALIBRATION

CROSS REFERENCE TO RELATED APPLICATIONS

This application is a continuation of U.S. patent application Ser. No. 14/173,717 entitled "Terrestrial Positioning System Calibration" filed Feb. 5, 2014. This application claims the benefit of and priority to U.S. Provisional Application No. 61/762,305 entitled "Cloud Based Calibration of Terrestrial Positioning Systems," filed Feb. 7, 2013, U.S. Provisional Application No. 61/807,662 entitled "Determination of Differential Forward Link Calibration in LTE Networks for Positioning," filed Apr. 2, 2013, U.S. Provisional Application No. 61/817,813 entitled "Determination of Differential Forward Link Calibration in LTE Networks for Positioning," filed Apr. 30, 2013, and U.S. Provisional Application No. 61/838,866 entitled "Determination of Differential Forward Link Calibration in LTE Networks for Positioning," filed Jun. 24, 2013, all of which are assigned to the assignee hereof and incorporated by reference, in their entireties, herein.

FIELD

The subject matter disclosed herein relates generally to terrestrial positioning systems, and in particular, to methods for calibrating terrestrial positioning systems.

BACKGROUND

It is often desirable to know the location of a terminal such as a cellular phone. For example, a location services (LCS) client may desire to know the location of a terminal in the case of an emergency services call or to provide some service to the user of the terminal such as navigation assistance or direction finding. The terms "location" and "position" are synonymous and are used interchangeably herein.

One method of determining the location of Mobile Stations (MS') is based on measurements of the times of signal arrival from multiple antennas. For example, an MS may measure time differences in received signals from a plurality of base station antennas. Because positions of the base station antennas are known, the observed time differences may be used to calculate the location of the terminal.

An MS may make use of a Base Station Almanac (BSA) to perform measurement calculations and/or may send the measurements to a location server for position calculation. The term Advanced Forward Link Trilateration (AFLT) is used to describe terrestrial positioning in Code Division Multiple Access (CDMA) systems, while the term Observed Time Difference of Arrival (OTDOA) is used in the context of Wideband CDMA (WCDMA) and Long Term Evolution (LTE) systems.

Typically, accuracy in terrestrial positioning is dependent on synchronization of base station clocks and signal transmissions. However, variations in hardware and installation procedures may cause variations in inter-cell synchronization on the order of hundreds of nanoseconds. Even a 100 nanosecond synchronization variation between cells translates into 30 meters of ranging error. Therefore, for optimal performance, terrestrial positioning systems require calibration.

However, current calibration procedures are cumbersome and resource intensive, and often involve significant field data collection in the vicinity of every cell transmitter in a network. Additionally, calibrations change with time due to network maintenance and/or reconfiguration. Thus, in existing systems, resource intensive calibration work is repeatedly performed for optimum positioning performance. Consequently, deployment interest in terrestrial positioning systems has waned because of resource intensive nature of terrestrial positioning system calibration.

Therefore, there is a need for systems and methods to facilitate terrestrial positioning system calibration, thereby improving terrestrial positioning system deployment and utilization.

SUMMARY

In some embodiments, a method may comprise: receiving a plurality of measurement sets for an antenna from a first plurality of Mobile Stations (MS), wherein each measurement set is associated with a corresponding measurement location estimate and a measurement location uncertainty estimate. Further, stored Base Station Almanac (BSA) data for the antenna may be updated by aggregating a subset of the plurality of the measurement sets with stored BSA data for the antenna based, at least in part, on the corresponding measurement location estimate and the measurement location uncertainty estimate associated with each measurement set in the subset; and at least one map comprising a plurality of map layers may be obtained, where each map layer associates locations in the BSA with spatially variable Forward Link Calibration (FLC) values for the antenna derived from the updated BSA data, wherein each spatially variable FLC value is associated with a corresponding location in the updated BSA data.

In another embodiment, a method on a Mobile Station (MS) may comprise obtaining location assistance data comprising a map with a plurality of map layers, wherein each map layer associates locations in a Base Station Almanac (BSA) with spatially variable Forward Link Calibration (FLC) values for an antenna. Further, measurements may be performed based on the location assistance data to obtain a measurement set comprising signal measurements for the antenna, wherein a calibration comprising at least one spatially variable FLC value in the location assistance data may be applied to at least one measurement in the measurement set. The measurement set may then be sent to a BSA server.

Embodiments disclosed also relate to a server comprising: a memory, the memory to store Base Station Almanac (BSA) data for an antenna. The server may further comprise a communications interface, the communications interface to receive a plurality of measurement sets for an antenna from a first plurality of Mobile Stations (MS), wherein each measurement set is associated with a corresponding measurement location estimate and a measurement location uncertainty estimate; and a processor coupled to the memory and the communications interface. In some embodiments, the processor may be configured to: update Base Station Almanac (BSA) data for the antenna in the memory by aggregating a subset of the received plurality of the measurement sets with previously stored BSA data for the antenna based, at least in part, on the corresponding measurement location estimate and measurement location uncertainty estimate associated with each measurement set in the subset; and obtain at least one map comprising a plurality of map layers, where each map layer associates locations in the BSA with spatially variable Forward Link Calibration (FLC) values for the antenna derived from the updated BSA data, wherein each spatially variable FLC value is associated with a corresponding location in the updated BSA data.

In some embodiments, a Mobile Station (MS) may comprise: a processor, wherein the processor is configured to: obtain location assistance data comprising a map with a plurality of map layers, wherein each map layer associates locations in a Base Station Almanac (BSA) with spatially variable Forward Link Calibration (FLC) values for an antenna, and perform, based on the location assistance data, measurements to obtain a measurement set comprising signal measurements for the antenna, wherein a calibration comprising at least one spatially variable FLC value in the location assistance data is applied to at least one measurement in the measurement set. Further, the MS may comprise a transceiver coupled to the processor, the transceiver to send the measurement set to a BSA server.

In another aspect, a server is disclosed comprising: storage means, the storage means to store Base Station Almanac (BSA) data for an antenna; and communications interface means, the communications interface means comprising means for receiving a plurality of measurement sets for an antenna from a first plurality of Mobile Stations (MS), wherein each measurement set is associated with a corresponding measurement location and a measurement location uncertainty estimate. Further, the server may comprise: means for updating stored Base Station Almanac (BSA) data for the antenna, the means for updating further comprising means for aggregating a subset of the received plurality of the measurement sets with stored BSA data for the antenna based, at least in part, on the corresponding measurement location estimate and measurement location uncertainty estimate associated with each measurement set in the subset; and means for obtaining spatially variable Forward Link Calibration (FLC) values for the antenna derived from the updated BSA data, wherein each spatially variable FLC value is associated with a corresponding location in the BSA data.

In a further aspect, a Mobile Station (MS) may comprise: means for obtaining location assistance data comprising a map with a plurality of map layers, wherein each map layer associates locations in a Base Station Almanac (BSA) with spatially variable Forward Link Calibration (FLC) values for an antenna; means for performing measurements based on the location assistance data to obtain a measurement set comprising signal measurements for the antenna, wherein a calibration comprising at least one spatially variable FLC value in the location assistance data is applied to at least one measurement in the measurement set; and transceiver means coupled to the means for performing measurements, the transceiver to send the measurement set to a BSA server.

Embodiments disclosed also pertain to a computer-readable medium comprising instructions, which, when executed by a processor, perform steps in a method, wherein the steps may comprise: receiving a plurality of measurement sets for an antenna from a first plurality of Mobile Stations (MS), wherein each measurement set is associated with a corresponding measurement location estimate and a measurement location uncertainty estimate; updating stored Base Station Almanac (BSA) data for the antenna by aggregating a subset of the plurality of the measurement sets with stored BSA data for the antenna based, at least in part, on the corresponding measurement location estimate and the measurement location uncertainty estimate associated with each measurement set in the subset; and obtaining at least one map comprising a plurality of map layers, where each map layer associates locations in the BSA with spatially variable Forward Link Calibration (FLC) values for the antenna derived from the updated BSA data, wherein each spatially variable FLC value is associated with a corresponding location in the updated BSA data.

Additional embodiments relate to a computer-readable medium comprising instructions, which, when executed by a processor on a Mobile Station (MS), may perform steps in a method, wherein the steps may comprise: obtaining location assistance data comprising a map with a plurality of map layers, wherein each map layer associates locations in a Base Station Almanac (BSA) with spatially variable Forward Link Calibration (FLC) values for an antenna; performing, based on the location assistance data, measurements to obtain a measurement set comprising signal measurements for the antenna, wherein a calibration comprising at least one spatially variable FLC value in the location assistance data is applied to at least one measurement in the measurement set; and sending the measurement set to a BSA server.

The methods disclosed may be performed by one or more of servers (including location servers), mobile stations, etc. using LPP, LPPe or other protocols. Embodiments disclosed also relate to software, firmware, and program instructions created, stored, accessed, read or modified by processors using non transitory computer readable media or computer readable memory.

BRIEF DESCRIPTION OF THE DRAWINGS

FIG. 4B show a map 430 for grid tile 410 in FIG. 4A, which may include further lower level grids with finer position granularity.

DETAILED DESCRIPTION

The terms "mobile station" (MS), "user equipment" (UE) or "target" are used interchangeably herein and may refer to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The terms are also intended to include devices which communicate with a personal navigation device (PND), such as by short-range wireless, infrared, wireline connection, or other connection—regardless of whether satellite signal reception, assistance data reception, and/or position-related processing occurs at the device or at the PND. The MS may represent a mobile telephone, notepad computer or laptop, or it may be a vehicle that collects said measurement sets for the purpose of creating street maps and/or the delay and/or signal strength maps herein.

In addition, the terms MS, UE, "mobile station" or "target" are intended to include all devices, including wireless and wireline communication devices, computers, laptops, etc. which are capable of communication with a server, such as via the Internet, Wi-Fi, cellular wireless network, DSL network, packet cable network or other network, and regardless of whether satellite signal reception, assistance data reception, and/or position-related processing occurs at the device, at a server, or at another device associated with the network. Any operable combination of the above are also considered a "mobile station."

Figure 1:
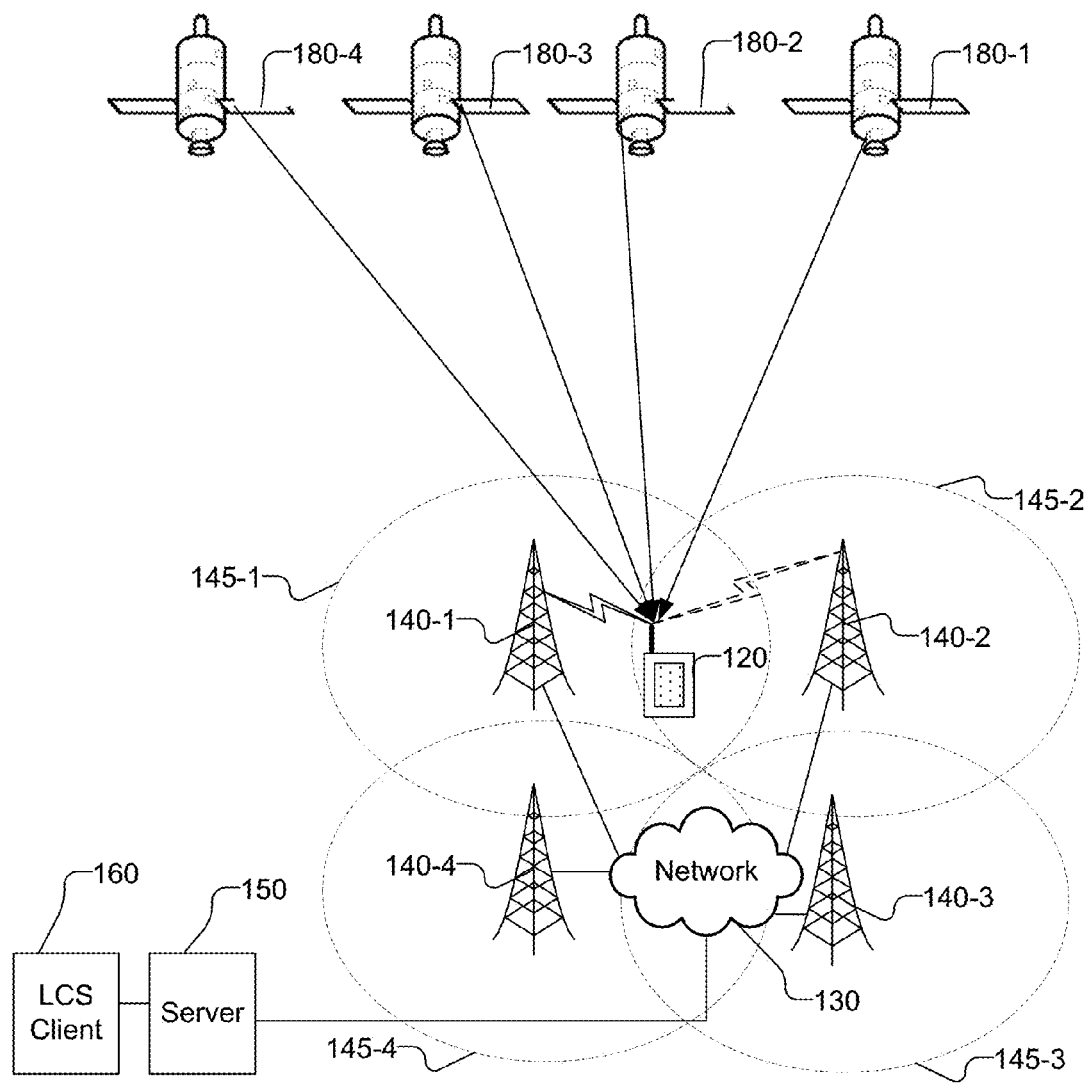
FIG. 1 shows an architecture of a system capable of providing Location Services to UEs including the transfer of location assistance data or location information.

FIG. 1 shows an architecture of a system 100 capable of providing Location Services to UEs including the transfer of location assistance data or location information. As illustrated in FIG. 1, the MS 120 may communicate with server 150 through network 130 and base station antennas 140-1-140-4, collectively referred to as antennas 140, which may be associated with network 130. Server 150 may, in some instances, provide the functionality of one or more of a location server, position determination entity (PDE), or another network entity. The transfer of the location information may occur at a rate appropriate to both MS 120 and server 150.

In some embodiments, system 100 may use messages such as Long Term Evolution (LTE) Positioning Protocol (LPP) or LPP extensions (LPPe) messages between MS 120 and server 150. The LPP Protocol is well-known and described in various publicly available technical specifications from an organization known as the 3rd Generation Partnership Project (3GPP). LPPe has been defined by the Open Mobile Alliance (OMA) and may be used in combination with LPP such that each combined LPP/LPPe message would be an LPP message comprising an embedded LPPe message.

In some embodiments, MS 120 may receive and measure signals from base station antennas 140, which may be used for position determination. Antennas 140 may form part of a wireless communication network, which may be a wireless wide area network (WWAN), wireless local area network (WLAN), a wireless personal area network (WPAN), and so on. The term "network" and "system" are often used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), WiMax and so on.

A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM, W-CDMA, and LTE are described in documents from an organization known as the "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN. For example, antennas 140 and network 130 may form part of, e.g., an evolved UMTS Terrestrial Radio Access Network (E-UTRAN) (LTE) network, a W-CDMA UTRAN network, a GSM/EDGE Radio Access Network (GERAN), a 1xRTT network, an Evolution-Data Optimized (EvDO) network, a WiMax network or a WLAN.

MS 120 may also receive signals from one or more Earth orbiting Space Vehicles (SVs) 180-1-180-4 collectively referred to as SVs 180, which may be part of a satellite positioning system (SPS). SVs 180, for example, may be in a constellation of Global Navigation Satellite System (GNSS) such as the US Global Positioning System (GPS), the European Galileo system, the Russian Glonass system or the Chinese Compass system. In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

For simplicity, only one MS 120 and server 150 are shown in FIG. 1A. In general, system 100 may comprise multiple cells indicated by 145-$k$ ($0 \leq k \leq N_{cells}$, where $N_{cells}$ is the number of cells) with additional networks 130, LCS clients 160, mobile stations 120, servers 150, (base station) antennas 140, and Space Vehicles (SVs) 180. System 100 may further comprise a mix of cells including macrocells and femtocells in a manner consistent with embodiments disclosed herein.

MS 120 may be capable of wirelessly communicating with server 150 through one or more networks 130 that support positioning and location services, which may include but are not limited to the Secure User Plane Location (SUPL) location solution defined by OMA and the Control Plane location solution defined by 3GPP for use with an LTE serving network. For example, Location services (LCS) may be performed on behalf of LCS Client 160 that accesses server 150 (which may provide functionality associated with a location server) and issues a request for the location of MS 120. Server 150 may then respond to LCS client 160 with a location estimate for MS 120. LCS Client 160 may also be known as a SUPL Agent—e.g. when the location solution used by server 150 and MS 120 is SUPL. In some embodiments, MS 120 may also include an LCS Client or a SUPL agent (not shown in FIG. 1) that may issue a location request to some positioning capable function such as a Position Determination Module (PDM) or Positioning Engine (PE) within MS 120 and later receive back a location estimate for MS 120. The LCS Client or SUPL Agent within MS 120 may perform location services for the user of MS 120—e.g. provide navigation directions or identify points of interest within the vicinity of MS 120.

Server 150 may take the form of a SUPL Location Platform (SLP), an evolved Serving Mobile Location Center (eSMLC), a Serving Mobile Location Center (SMLC), a Gateway Mobile Location Center (GMLC), a Position Determining Entity (PDE), a Standalone SMLC (SAS), and/or the like.

As illustrated in FIG. 1, the MS 120 may communicate with server 150 through network 130 and antennas 140, which may be associated with network 130. MS 120 may receive and measure signals from antennas 140, which may be used for position determination. For example, MS 120 may receive and measure signals from one or more of antennas 140-1, 140-2, 140-3 and/or 140-4, which may be associated with cells 145-1, 145-2, 145-3 and 145-4, respectively, in order to facilitate position determination. As another example, MS 120 may use a hybrid position location scheme, using a Global Positioning System (GPS) receiver on MS 120 and computing its position based on both AFLT and GPS measurements (e.g. from SVs 180). In some embodiments, a combination of measurements from GNSS', terrestrial measurements (e.g. AFLT, cell sector measurements, WLAN measurements, OTDOA) and/or sensor measurements (e.g. measurements using inertial sensors, cameras or image sensors, acoustic sensors, etc.) may be used to obtain a position estimate. The term "measurement set" is used to refer to signal measurements performed by an MS at a specific measurement location and point in time. The signal measurements made may be related to position determination. The signal measurements made may also depend on system 100, the capabilities of the MS, and/or the signal characteristics that are available for measurement by MS 120 at a specific location/time. Typically, the measurement set may comprise measurements pertaining to one or more signal characteristics that are stored in a Base Station Almanac (BSA) and/or used for location determination.

In some embodiments, the position estimate obtained may be a coarse and/or initial position estimate and may be refined in a manner consistent with disclosed embodiments. In general, measurements made by the mobile station may be combined with network related measurements to enhance the availability and accuracy of the computed positions of MS 120 and/or antennas 140.

As another example, in OTDOA based positioning, which is used with WCDMA and LTE, MS 120 may measure time differences in received signals from a plurality of base station antennas 140. Because positions of the antennas 140 are known, the observed time differences may be used to calculate the location of MS 120. For example, the measured time difference of arrival of Positioning Reference Signals (PRS), which is termed the Reference Signal Time Difference (RSTD), may be used along with the absolute or relative transmission timing of each cell, and the known position(s) of antennas 140 for the reference and neighboring cells, to calculate the position of MS 120.

In AFLT based positioning, which is used with CDMA, MS 120 may measure phases of pilot signals, which are synchronized to an absolute time scale (e.g. GPS time), and transmitted from four base station antennas 140-1-140-4. The measured phase of a pilot signal from an antenna 140-$i$, $1 \leq i \leq 4$ may be used to calculate the distance between MS 120 and the respective antenna. The set of distance measurements may be used to calculate location of MS 120, provided the time offsets of antennas 140 are known.

MS 120 may obtain a measure of time synchronization of the forward link cell signal by comparing the time of arrival of a cell signal with the absolute time scale. MS 120 may record the known GPS position and GPS time at the time of this measurement and using the known position of the cell transmitter(s), such as antenna 140-1, a time of arrival bias for the cell signal may be determined. Determination of the time bias for a cell signal is known as Forward Link Calibration (FLC). In some instances, MS 120 may send raw measurement information to server 150, which may perform the forward link calibration. For example, the distance correction is quantified as a forward link calibration value (FLC). FLC improves positioning accuracy because even a synchronization variation of the order of a 100 ns between cells will translate into 30 meters of ranging error. Therefore, FLC facilitates optimal performance in terrestrial positioning systems.

In existing terrestrial positioning systems, determination of FLC involves extensive field operations and inaccuracies may often result. Inaccuracies may result, for example, because locations of antennas 140 may not have been determined with adequate precision to provide good location fixes using AFLT or hybrid approaches. Additional inaccuracies may result because the base station location listed in the BSA may correspond to the location of the transceiver, rather than to the location of the antenna, which, in some environments (e.g. urban areas), may be located an appreciable distance away from the transceiver. Moreover, the locations of antennas, which are often changed as wireless service providers expand and update their coverage, may not always be reflected in the BSA in a timely manner. Further, in existing systems, to be statistically significant, repeated FLC measurements and analysis of the measurement are needed, and any hardware and/or configuration changes to the BS may result in a new measurement cycle. Thus, in existing systems, FLC is a resource intensive, continuous maintenance process.

Accordingly, embodiments disclosed herein facilitate terrestrial positioning system calibration, thereby improving position estimation and optimizing terrestrial positioning system deployment and utilization.

Figure 2:
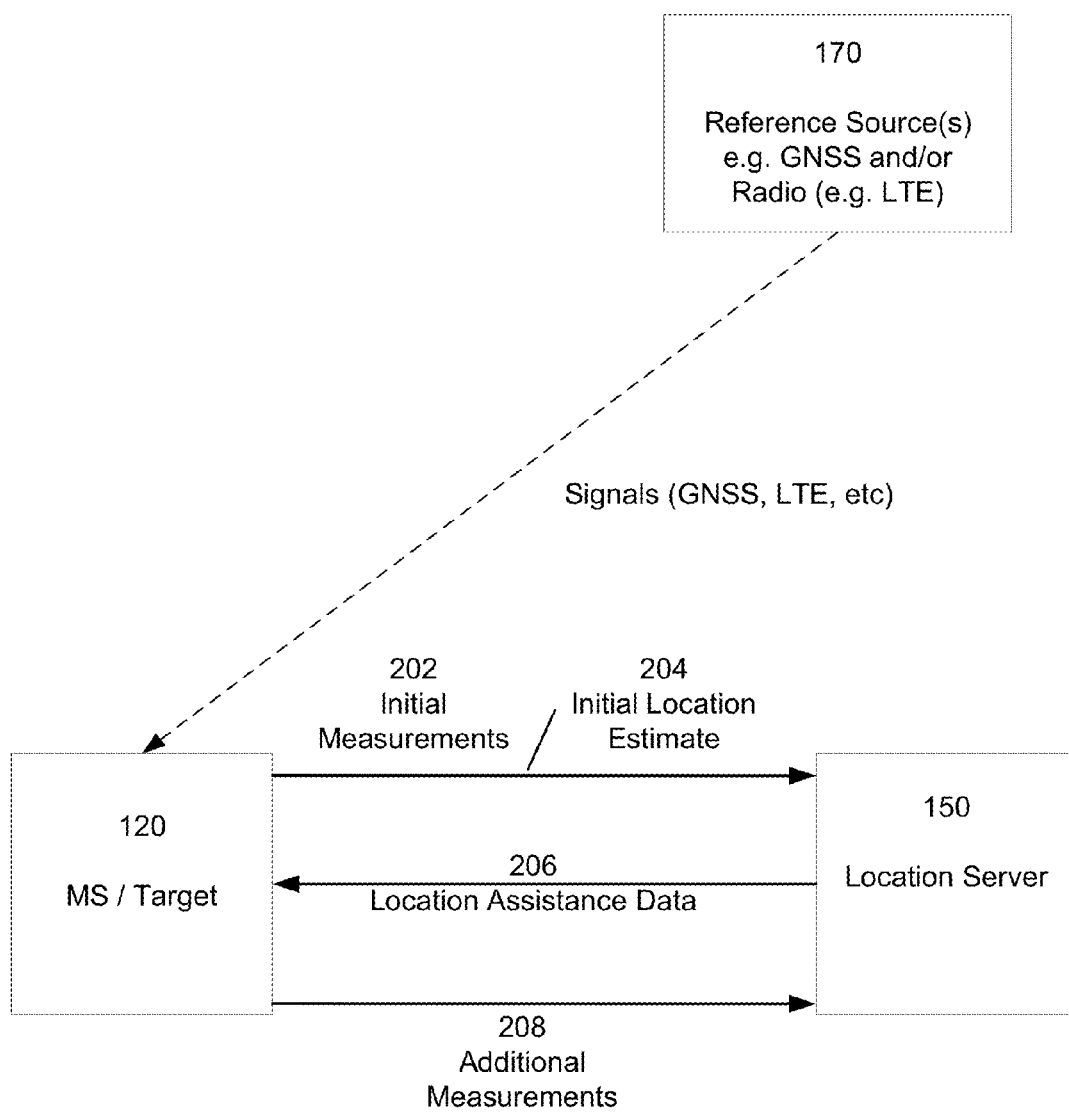
FIG. 2 shows a simplified block diagram illustrating some entities in a system capable of determining the location of an MS.

FIG. 2 shows a simplified block diagram illustrating some entities in a system 200 capable of determining the location of MS 120. In some embodiments, system 200 may form part of an MS assisted positioning system. Referring to FIG. 2A, MS 120 may measure signals from reference source(s) 170 to obtain initial measurements 202 and/or initial location estimate 204. Reference source(s) 170 may represent signals from SVs 180 and/or antennas 140 associated with network 130. MS 120 may also obtain initial measurements 202 such as, for example, pseudo-range measurements for SVs 180 and/or OTDOA/RSTD related measurements from antennas 140.

In some instances, MS 120 may also obtain an initial location estimate 204 by using initial measurements 202 to derive an initial location estimate 204. Initial location estimate 204, which is sometimes termed a "prefix", may be a coarse estimate of the position of MS 120. In some instances, range measurements by MS 120 may be used to obtain initial location estimate 204. In some instances, a location associated with the serving cell, or the strongest cell, or the earliest cell, or another cell may be used as initial location estimate 204. For example, the centroid of the serving cell, or the strongest cell, or the earliest cell, or some other cell may be used as initial location estimate 204. As a further example, a random or default starting location within a cell may be used as initial location estimate 204. Cell related information may be obtained from the Cell Sector Identity, Network ID, System ID, and other information transmitted by the base station. MS 120 may provide initial location estimate 204 and/or initial measurements 202 (e.g., satellite measurements from one or more GNSSs, or network measurements such as OTDOAs and/or RSTDs from one or more networks, etc.) to server 150. In some situations, MS 120 may not determine initial location estimate 204, instead, initial measurements 202 taken by MS 120 may be sent to server 150, which may use initial measurements 202 to determine initial location estimate 204 for MS 120.

Server 150 may provide then provide location related information based on initial location estimate 204, such as location assistance data 206 to MS 120, which may be used to assist MS 120 in acquiring and measuring signals from SVs 180 and/or antennas 140, and/or in refining any initial location estimate 204 obtained from measurements 202. For example, MS 120, which in some instances may take the form of a Secure User Plane (SUPL) Enabled Terminal (SET), may communicate with server 150 and use location assistance data 206 obtain additional measurements 208. In some embodiments, additional measurements 208 may comprise various FLC related measurements. Additional measurements 208 may include Pilot Phase measurements, Time of Arrival, RSTD/OTDOA measurements, measurements related to time offsets of base station antennas, GPS (e.g. pseudorange) measurements, etc. In some embodiments, MS 120 may send additional measurements 208 to server 150 or another PDE.

In some embodiments, server 150, MS 120, or another PDE may use additional measurements 208 to obtain a refined location for MS 120. In some embodiments, MS 120 may use additional measurements 208 to directly obtain a refined location estimate. Further, in some embodiments, the refined location estimate for MS 120 may be communicated to LCS client 160 (not shown in FIG. 1B). In general, position location may be MS-assisted, where MS 120 sends back raw or pre-processed measurement data through the base station to a PDE in the network for use in position determination; or, MS-based, where the position computation is performed by MS 120.

Wireless communication systems that provide position determination services, typically store calibration information and other related base station information in a calibration database, which is known as a base station almanac (BSA). The BSA record for a base station may specify the base station identification information, the position (e.g. altitude, latitude and longitude) of the base station antenna(s), FLC values at a position for an antenna, antenna orientation, range, repeater information, etc. The term "FLC value" as used herein may refer to both FLC values and FLC residuals. FLC residuals may be specified in distance units (e.g. meters), while FLC values may be specified in time units (e.g. seconds). In some embodiments, the BSA may also include information such as the center of a base station sector coverage area, the maximum range of the base station signals, the average terrain height over one or more coverage area(s)/sub-area(s), the terrain height standard deviation over the one or more coverage area(s)/sub-area(s), round-trip delay (RTD) calibration information, pseudo-random noise (PN) increments in CDMA systems, uncertainty in the base station antenna position, uncertainty in the forward-link delay calibration, and uncertainty in the round-trip delay calibration.

In some embodiments, a system to facilitate terrestrial positioning system calibration may aggregate additional measurements 208, including FLC related measurements and refined position estimates by a plurality of mobile stations/PDEs. In some embodiments, FLC measurements by each of the plurality of mobile stations may be aggregated and stored on a server and statistical significance may be derived based on the aggregation. For example, a standard deviation, variance, mean, median and other statistical measures may be derived from the aggregation. In some embodiments, in both the MS-based and MS-assisted cases, additional measurements 208 and/or the refined position estimate may be obtained by a network entity and used to update the BSA. In some embodiments, one or more of the data/measures stored in the BSA may be obtained and/or derived from the aggregation of additional measurements 208 by the plurality of MS' with preexisting stored BSA data.

For example, a refined position estimate of MS 120 may be associated and/or aggregated with measurements by other mobile stations for the same location and/or for a region in the vicinity of that location based on the granularity of the information stored in the database. In some embodiments, the refined position estimate may be associated with the aggregated measurements based on a quality threshold associated with the position fix. For example, a "Horizontal Estimated Position Error" (HEPE) quality measure, which represents an estimate of the error associated with each location fix, may be used to determine which measurements are added and/or aggregated to the BSA database. For example, measurements associated with position fixes with a HEPE value of less than 50 meters, or some other specified threshold depending on the desired accuracy or position granularity—may be added and/or aggregated with the BSA database.

Figure 3:
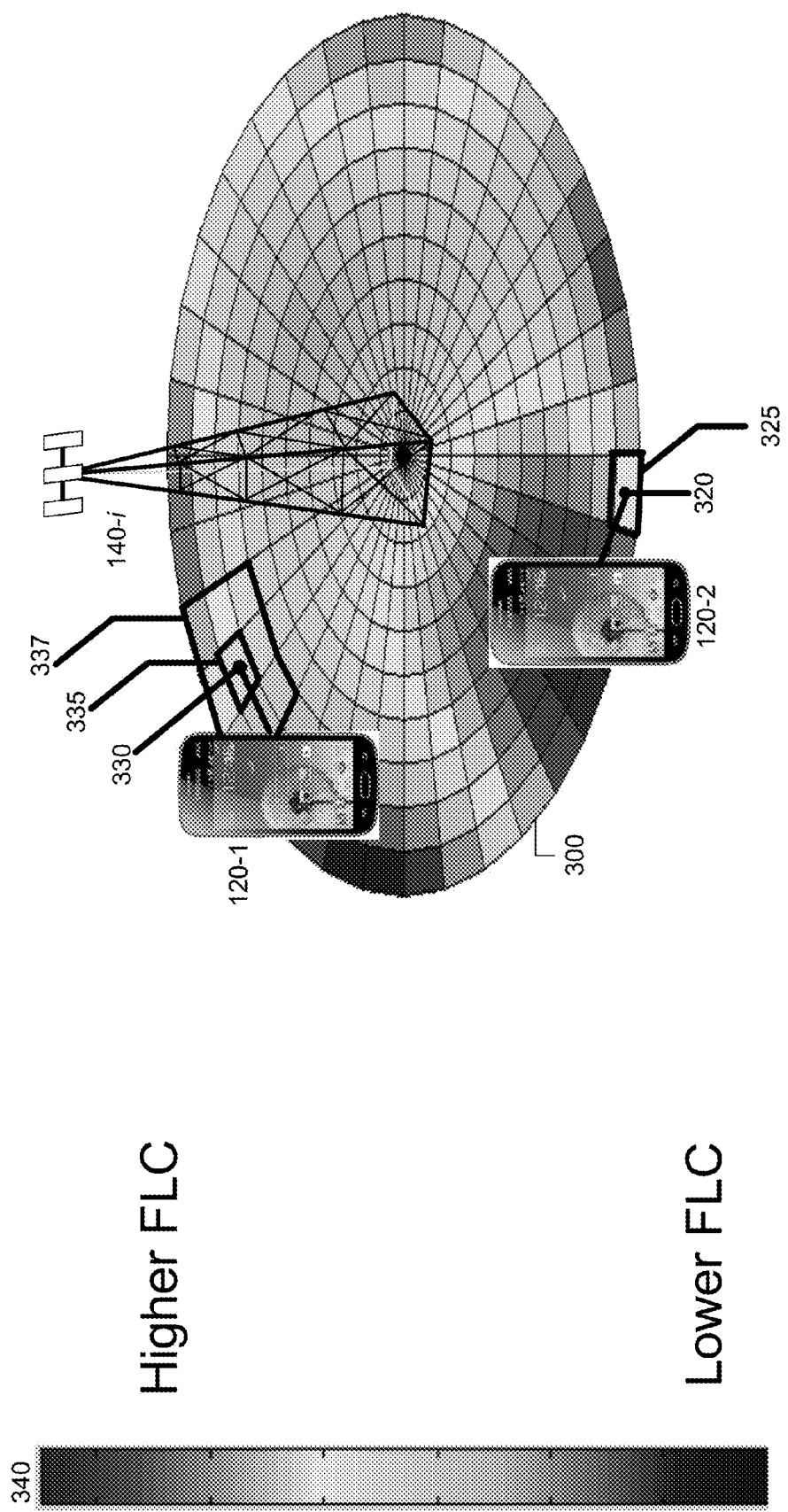
FIG. 3 shows a visual depiction of an exemplary map with estimated FLC values for various locations relative to an antenna.

FIG. 3 shows a visual depiction of an exemplary map 300 with estimated FLC values for various locations relative to antenna 140-i. As shown in FIG. 3, map 300 is color coded to reflect locations with higher FLC values and locations with lower FLC values as shown by map key 340.

Because FLC values at a position may be affected by multipath, FLC values may be tailored to various MS positions based on additional measurements 208 received from the plurality of mobile stations at that position to mitigate the effect of multipath. Multipath refers to effects caused by the reflection of radio signals by objects. Reflected radio signals are delayed relative to direct or line of sight signals and reach the MS receiver later than the direct signal. The delay may result in an error in position determination. Thus, for example, based on the information in map 300, assistance information may be provided to MS 120-1 resulting in the use of the FLC value corresponding to region 335, while MS 120-2 may use the FLC value corresponding to position 325.

In some embodiments, a representation of map 300 may form part of a hierarchy with different levels or layers of FLC/position granularity. For example, a representation of map 300 may be at a first level and linked to additional maps, which may provide finer FLC/position granularity at lower levels and/or coarser FLC/position granularity at higher levels. For example, if MS 120-2 has been located at position 320 in region 325 on map 300, then a lower level map may expand region 325 and provide additional FLC detail for region 325, thereby permitting further tailoring of FLC values to MS 120 position within region 325. Further, map 300 may also be linked to a higher level map with coarser position granularity. For example, a higher level map may provide position/FLC granularity at the level of region 337, when MS 120-2 has been located at position 330, while map 300 may provide FLC/position granularity at the level of region 325 on map 300.

The term "layer" or "map layer" as used herein refers to information, such as location assistance information, tailored to a position and position uncertainty of an MS. For example, location assistance information comprising a first FLC value may be provided in a first map layer to MS 120 based on an estimated first position and position uncertainty of MS 120. When the position/position uncertainty of MS 120 is refined or re-estimated based on the previously provided location assistance information, FLC values based on the refined position estimate/position uncertainty may be retrieved from another map layer to facilitate a more accurate determination of MS position.

In general, map layers may comprise various other types of information. For example, map layers may comprise one or more of: a received signal strength map layer that correlates a received signal strength with map locations; a Signal to Noise Ratio (SNR) map layer correlating SNRs with map locations; a Line of Sight (LOS) map layer indicating map locations where LOS conditions are likely with respect to one or more antennas; a Non-Line of Sight map layer, the NLOS map layer indicating map locations where NLOS or body blocked conditions are likely with respect to one or more antennas, etc. In some embodiments, the map layers may also comprise at least one multipath layer to provide an indication of the extent of multipath for the antenna for locations in the BSA. Further, in one embodiment, the multipath layer may further comprise at least one of: a long shadow layer to indicate long shadow regions for the antenna, the long shadow layer comprising exclusion zones, an indication of the magnitude of multipath, and/or signal attenuation levels for the antenna in the long shadow regions; or a short shadow layer to indicate short shadow regions for the antenna, the short shadow layer comprising timing granularity information for antenna signals in the short shadow regions; or a transmitting pattern layer to indicate unique transmission patterns in at least one coverage area of the antenna. In some embodiments, MS 120 may use information in one or more map layers to estimate a location and location uncertainty, and based on the location and location uncertainty may request additional map layers. In some embodiments, a plurality of map layers may be provided to MS 120 based on the location/location uncertainty of MS 120. In general, location assistance information comprising map layers may be provided to MS 120 based on protocols used for communication with MS 120, available bandwidth for communication, signal conditions, cost, communication, memory and/or processing capability available at MS 120 and various other parameters.

In some embodiments, each region on a map may be identified by the coordinates (e.g. latitude, longitude, altitude) of one or more boundary points, which may be dependent on the granularity of the map layer. Accordingly, in these embodiments, measurements pertaining to points within a region may be aggregated and associated with the region. Some or all of the hierarchy of aggregated measurements and related data may be provided to MS 120 based on its position/position uncertainty.

In some embodiments, server 150 may comprise a BSA with measurement data including the locations of antennas 140, time of arrival, and/or GPS measurements, as determined by a plurality of MS' 120. In some embodiments, measurements received from the plurality of MS' 120 may be aggregated with existing/stored measurements and used to determine a statistically significant spatially-variable FLC for positions in cells 145 in a cellular network. For example, contiguous regions on map 300 may be formed and/or demarcated based on a statistical similarity of FLC values within the region relative to FLC values outside the region. Thus, each location within a region may have FLC values that are statistically similar to other positions within the region.

In some embodiments, a base station almanac database may be configured initially with default, average or estimated FLC values and with reasonably accurate antenna positions. In some embodiments, existing BSAs may be used and updated based on the plurality of additional measurements 208 received from the plurality of MS' 120 and/or PDEs. Based on repeated measurements made by the plurality of MS'120/PDEs, the antenna position estimates and spatially-variable FLC values will continually improve over time leading to greater antenna position certainty, which may be used to improve the forward link calibration accuracy.

In some embodiments, the use of crowd sourced measurements by a plurality of MS' 120 may facilitate provision of spatially variable FLC values. For example, FLC values provided to MS 120 as location assistance data 178 may be based, at least in part, on an estimated location of MS 120. The term spatially variable FLC values is used to refer to FLC values and/or residuals that are MS location-specific and can vary with location, where the location may be specified with varying levels of granularity. For example, if the estimated MS location covers a region larger than the smallest available location granularity in a BSA, then, a statistically significant FLC value for that region may be provided (e.g. an average FLC value for an antenna over that region). On the other hand, if the position of MS 120 can be estimated with greater specificity, then a FLC value tailored to the specific location may be provided. Thus, in some embodiments, the spatially variable FLC values obtained by mobile stations may be dependent on the location uncertainty associated with the estimated location of the mobile station. Thus, as the location uncertainty decreases, increasingly specific spatially variable FLC values may be provided. In some embodiments, the spatially variable FLC values may be provided as a map layer in location assistance data provided to and/or requested by MS 120. Conversely, when a measurement set received from an MS The term crowd sourcing is used to refer to the collection and subsequent aggregation of the collected positioning and/or FLC related measurements from a plurality of mobile stations and/or PDEs. FLC related measurements, which may include raw measurement data and/or FLC residuals, may comprise position, time, and TOA measurements from base stations. The aggregated information may be stored on server 150, which may then derive statistically significant data from the aggregated positioning/FLC related measurements in a manner consistent with disclosed embodiments.

In some embodiments, server 150 may aggregate raw measurement information from a crowd of mobiles to create statistically significant spatially-variable FLC, shadowing and multipath models and/or maps. In some embodiments, server 150 may perform some or all of the functions of a BSA and/or location server. For example, server 150 may collect and format location data, may provide assistance to mobile stations for position estimation, and/or may perform computations to obtain position estimates for the mobile stations. In some embodiments, server 150 may comprise a BSA server, which may manage a BSA database that stores a complete BSA.

In some embodiments, crowd sourced measurements by a plurality of MS' 120-1 may be used to provide spatially variable FLC values. For example, a mobile station 120-1 at a first location may have a first associated FLC value with respect to antenna 140-1, while mobile station 120-2 at a second location may have a second associated FLC value with respect to the same antenna. Many different encodings of variable FLC values can be used by MS' 120 to calculate their respective positions in accordance with the teachings herein. In one embodiment, FLC values may be encoded based on a curve fit of the input calibration data and associated coefficients. In some embodiments, grid encoding, or cylindrical harmonic coefficients could be utilized. Other examples or forms of spatial maps may also be utilized. Further, FLC values may be provided in forms other than a spatial map.

Embodiments disclosed, for example, including the crowd sourcing of measurements from a plurality of mobile stations/PDEs, may provide continuously maintained spatially-variable FLC values and reduce or remove the need for resource intensive field work. In addition, other positioning technologies based on signal power (e.g. Received Signal Strength Indicators (RSSIs)) can also be crowd source calibrated in a similar way using a crowd sourced system, for example according to principles described herein. For example, a map layer may comprise spatially-variable RSSI values.

In some embodiments, automated calibration, for example, with a client/server crowd sourced system may provide many advantages for calibrating terrestrial positioning systems. A high sampling rate may be maintained throughout the network because of frequent crowd sourced sampling by publicly owned mobile devices. In some embodiments, the crowd sourced measurement may be used to build and/or update the BSA.

Because the sampling rate, statistical significance, and accuracy of information are proportional to user density at a location, popular locations, which have higher user density, will be calibrated frequently. Accordingly, such crowd based calibration systems may optimize themselves to where users are located and/or where location services are repeatedly used. In contrast, existing systems are typically calibrated based on some metric of network geometry or signal propagation models, which may not reflect usage patterns. Further, popular locations that are frequented by mobile station users will also tend to have up to date, statistically significant, and accurate information. In addition, during the deployment of a system consistent with embodiments disclosed herein, FLC information for popular locations may be quickly obtained based on more frequent gathered measurements thereby facilitating deployment.

In some embodiments, FLC related data and measurements may also be collected and/or supplemented by "wardriving". In wardriving, a vehicle or person may take measurements of wireless signals, which may be correlated to the vehicles position. The collected measurements may be aggregated with and/or used to supplement and/or replace measurements stored in a BSA database. In some embodiments, MS users, (e.g. users that are near a location or route where FLC related measurements are desired) may be incentivized to travel to the location and/or take a specified route. For example, a reward in the form of a cash reward, rebate, free airtime, or incentives targeted to establishments near the desired location or along the route may be used as incentives. In some embodiments, user consent may be obtained to install an application on a smartphone that may take and report measurements periodically. In some embodiments, the measurements may be obtained from mobile stations during regular position location sessions and/or when users make calls. In some embodiments, "opportunistic" FLC related signal measurements may be performed. For example, an application installed with user consent may measure cellular system signals, when a position fix is obtained by MS 120 and send the measurement set to server 150. In some embodiments, the measurement set may be sent to server 150 when the accuracy of the position fix exceeds some threshold. In some embodiments, the measurement set may be sent, when the MS 120 is located in an area where additional calibration may be worthwhile.

Figure 4A:
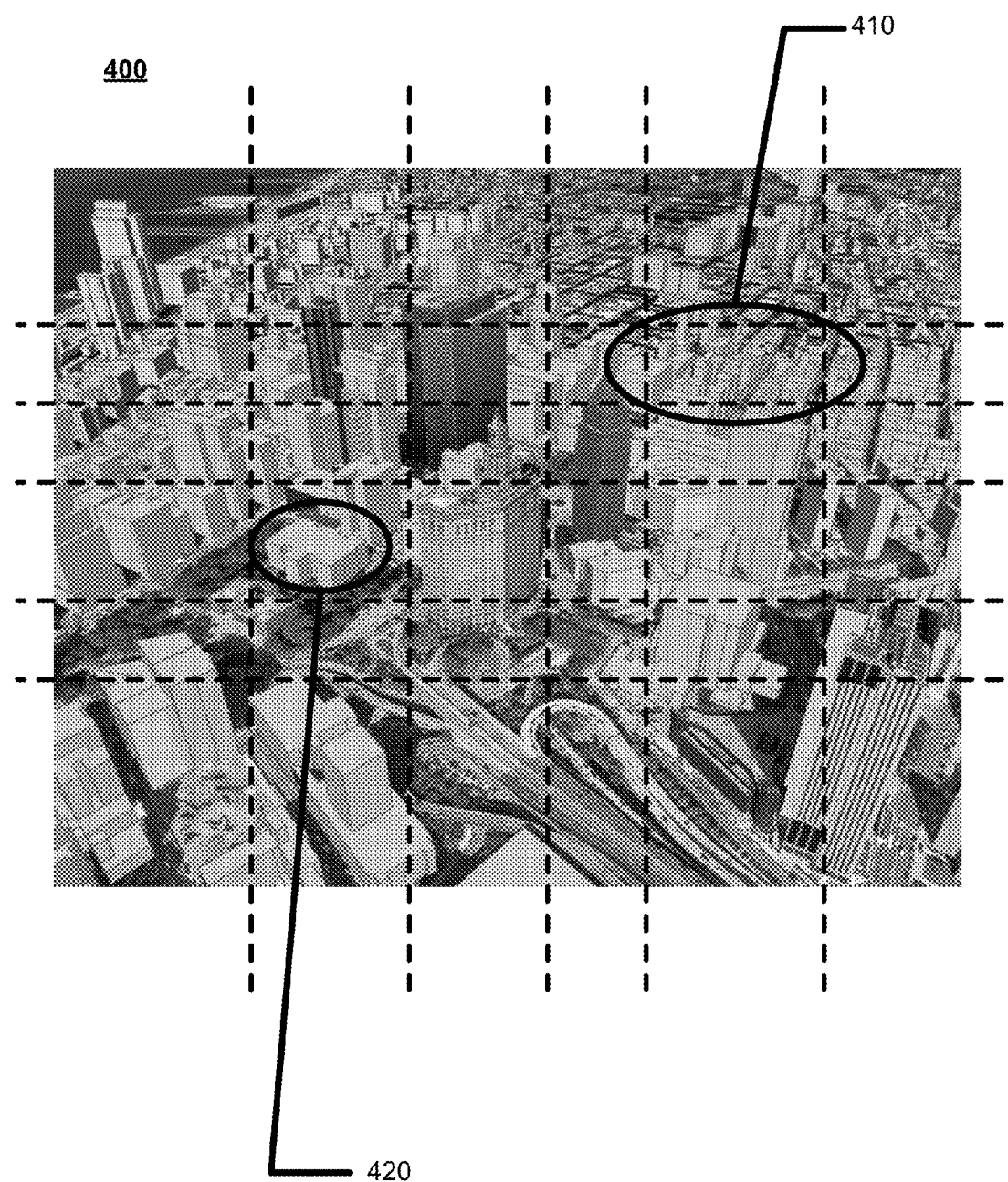
FIG. 4A shows exemplary terrain map for an urban environment.

FIG. 4A shows exemplary terrain map 190 for an urban environment. The physical environment built around base station transmitters may cause variations in signal path, while time calibration may depend on the hardware and/or configuration of base stations. For example, buildings and other features may affect the observed cell timing at various locations in FIG. 4A. Thus, the observed cell timing at various locations around an antenna 140-$i$ may be a combination of timing biases and path delays. Disclosed embodiments therefore facilitate the derivation of spatially variable FLC values that may account, at least in part, for timing biases and path delays. In general, when multi-path effects are present, one or more of relative phase, relative signal strength (SNR), absolute signal strength, or an a priori position estimate may be used in the derivation of spatially variable FLC values.

As shown in FIG. 4A, terrain map 400 may be divided into grids. For example, the grid tiles may be selected to represent a 1km x 1km size and each grid tile may have associated antenna-specific FLC residuals, where each FLC residual may correspond to an antenna for which measurements are available within the grid tile. Note that the grid size above is exemplary only. In general, the grid tiles may be uniform or non-uniform and based on system parameters, statistical significance such as the distribution and variation of FLC values across a region, and/or the position granularity desired/available for a given environment.

In some embodiments, map 400 may be one layer of a set of hierarchical maps, which may range from coarse position granularity at a higher level to fine position granularity at lower levels. For example, a high level map layer (e.g. with coarse position granularity) may include grids of FLC values at one resolution while a second lower level layer may include may include grids of FLC values at a second resolution (e.g. with finer position granularity).

In FIG. 4A, for example, if an initial location estimate for MS 120 indicates that MS 120 is located within grid tile 402, then location assistance data provided to MS 120 may comprise measurement information related to map 430 (which pertains to grid tile 410) as shown in FIG. 4B. Additionally, as shown in FIG. 4B, map 430 for grid tile 410 may include further lower level grids with finer position granularity, where each lower level grid tile associated with antenna-specific FLC values/residuals corresponding to an antenna for which measurements are available within the lower level grid tile.

Accordingly, in some embodiments, MS 120 may initially use map layer 400 (FIG. 4A) with associated FLC values at a coarse resolution. Information in map layer 400 may be used, for example, for prefix measurements/calculations to obtain an initial fix for MS 120. Further, when the initial fix so obtained results in smaller position uncertainty, then the appropriate map grid (or MS position in map 400) may be used as an index into a higher resolution map/FLC table (such as map 430 in FIG. 4B or map 440 in FIG. 4C), which may provide finer resolution grids and associated FLC values consistent with the new lower position uncertainty.

Thus, MS 100 may apply corrections to maps in an iterative fashion. For example, a statistical representation of multiple map values such as an average and/or weighted average bias and variance may be used to represent the signal calibration value and uncertainty at a given location, and location uncertainty. After one or more of these calibrations are used to determine an improved location estimate, the MS may re-compute new correction values based upon the narrowed location and location uncertainty. This further step of narrowing may include the retrieval of a more precise, locally defined, map covering a subset of the area associated with the less precise map. In some embodiments, the hierarchy of maps with associated calibration and/or BSA data may be provided to MS 120 as location assistance data.

Figure 4C:
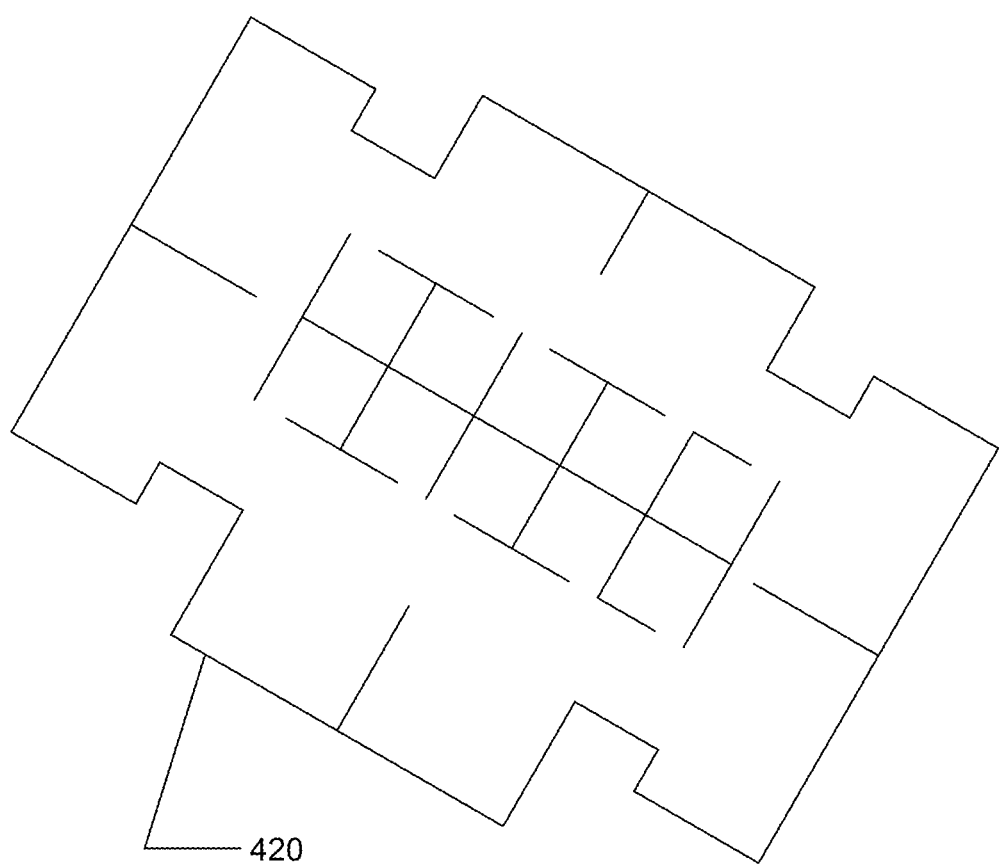
FIG. 4C shows a map for an indoor location for a structure within grid tile 420 in FIG. 4A, for a situation when a location estimate and/or initial measurements indicate than an MS may be located within the structure

FIG. 4C shows the plan view of an indoor location map. This map may be determined using, for example, images of pre-existing floor plans, registered to a higher level map. The map may include observed delays, signal strengths and/or attenuations within the indoor environment, or those attenuations, reflections and/or absorption associated with one or more surfaces of the structure. The indoor or structure map may also be determined using various techniques. This map may be downloaded once the device is determined to be in or in the vicinity of the structure, or when there is a known plan to be in the structure, for example, based upon a prior history or a planned navigation route. MS 100 may choose to store this map or certain layers of the map based upon its historical use and/or planned future use. In one embodiment, the map may be assigned a value based on a variety of criteria (e.g. accuracy/usability/completeness, precision, likelihood or frequency of use, value of use in the given locale, etc.), which may be compared to a cost of continuing to store the map such as, for example, the cost associated with size of map or layer relative to available memory on an MS, on-going storage, an actual financial cost, etc.

Thus, if an initial location estimate for MS 120 indicates that MS 120 is located within grid tile 420, then location assistance data provided to MS 120 may comprise measurement information for an indoor map 440 for a structure within grid tile 420, if the location estimate and/or initial measurements indicate that it is likely MS 120 may be located within the structure. Further, in some embodiments, the relative coordinates and/or assistance data for the indoor map 440 may be loosely associated with, or independent of, coordinates provided at the immediately higher level map layer because signal measurement conditions indoors may vary considerably from the conditions outside.

Figure 5:
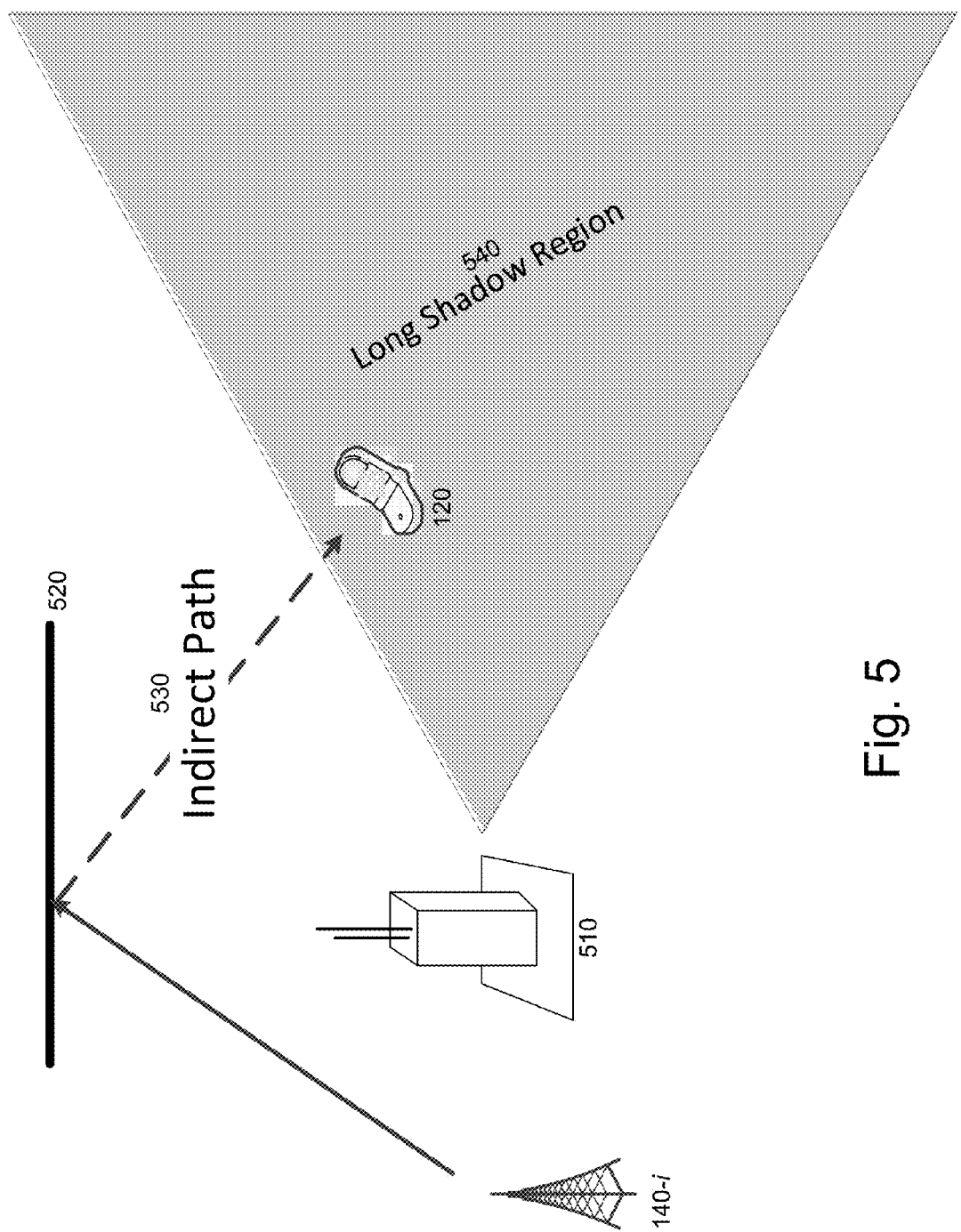
FIG. 5 shows an MS in the shadow of a large obstruction, where signals are received in the long shadow region via an indirect path.

FIG. 5 shows MS 120 in the shadow of a large obstruction 510, where signals are received in the area labeled long shadow region 540 via indirect path 530 via knife edge diffraction or reflection off feature 520. FIG. 5 shows the nominal case for long multipath.

In some embodiments, if MS is determined to be in long shadow region 540 for an antenna 140-$i$, then, all measurements pertaining antenna 140-$i$ for a specific evolved NodeB (eNB) or cell may be ignored or excluded. In some embodiments, a determination of whether MS 120 is in long shadow region 540 may be made based, at least in part, on the length of time or delay in a previous measurement event. In some embodiments, a determination of whether MS 120 is in long shadow region 540 may be made based, at least in part, on its estimated location and a priori computed probabilities in a multipath map or calibration map.

In some embodiments, a map may comprise a plurality of layers, and multipath information may be part of one or more layers of the map. In general, maps may be viewed as comprising of multiple layers. In one embodiment, successive map layers (e.g. from top down) may provide increasing position granularity and each layer may include information pertaining to FLC values/residuals, signal strength, signal attenuation levels, and/or other information stored in a BSA, etc for each antenna140-$i$ at various locations within that map layer and at a position granularity corresponding to that map layer. However, maps may be organized in various other ways in a manner consistent with embodiments disclosed herein and/or based on how the information is used by MS 120, system configuration parameters and/or to conform to protocols and/or standards in use for providing location assistance data. For example, maps may comprise a series of information layers, which may be conveyed to MS 120 as distinct information layers, dimensions, and/or as mathematical models.

In one embodiment, a map may comprise multipath map layers, which may include a long shadow layer, which may indicate long shadow regions for a given area. In some embodiments, long shadow region mapping may be used by MS 120 to determine whether to make measurements. For example, MS 120 may stop taking measurements, if its estimated location indicates that it is within long shadow region 240 for some antenna 140-$i$. In some embodiments, if the estimated location of MS 120 indicates that it is likely to be in long shadow region 240, server 150 may send MS 120 location assistance data to downgrade the desirability of searching for measurements for an antenna 140-$i$.

In some embodiments, long shadow maps may not include timing granularity, because long shadow maps specify regions where the measurements are much less desirable. Furthermore, long shadow maps also are likely to specify relatively large regions, so that position granularity may be deemphasized. For example, a poorly served contiguous long shadow region may comprise a single large grid on a map such as map 400. In some embodiments, long shadow maps may be provided as exclusion zones, specified by a polygon indicating a long shadow region (e.g. long shadow region 240) where measurements are not reliable. In some embodiments, long shadow regions in maps may also include signal attenuation level data, so that the likelihood of a long shadow situation may be determined, at least in part, from observed signal attenuation.

Accordingly, in some embodiments, based on observed signal attenuation for an antenna 140-$i$ at an initial estimated location, MS 120 may request a long shadow map layer, which may specify regions where the measurements are much less desirable for antenna 140-$i$. If signal attenuation levels for the initial estimated position provided in the long shadow map layer indicate that MS 120 is in a long shadow region, then MS 120 may select a signal acquisition strategy, where no further measurements from antenna 140-$i$ are obtained. As another example, if a (signal strength based) measurement set made by MS 120 and information in long shadow map layer suggest that MS 120 is in a long shadow region for antenna 140-$i$, then the measurement set may be de-weighted or given less weight in a navigation solution.

LTE also provides for the use of Cell Specific Reference Signals (CRS) and Positioning Reference Signals (PRS). PRS', which have been defined in 3GPP Long Term Evolution (LTE) Release-9, are transmitted by a base station in special positioning subframes that are grouped into positioning occasions. For example, in LTE, the positioning occasion, $N_{PRS}$ can comprise 1, 2, 4, or 6 consecutive positioning subframes ($N_{PRS} \in \{1, 2, 4, 6\}$) and may occur periodically at 160, 320, 640, or 1280 millisecond intervals. The positioning occasions recur with PRS Periodicity $T_{PRS}$, which may be measured in terms of the number of subframes between the start of consecutive positioning occasions.

Within each positioning occasion, PRSs are transmitted with a constant power. PRS can also be transmitted with zero power (i.e., muted). Muting, which turns off a regularly scheduled PRS transmission, may be useful when PRS patterns between cells overlap. Muting aids signal acquisition by MS 120. Muting may be viewed as the non-transmission of a PRS for a given positioning occasion in a particular cell. Muting patterns may be signaled to MS 120 using bitstrings. For example, in a bitstring signaling a muting pattern, if a bit at position j is set to "0", then an MS may infer that the PRS is muted for the $j^{th}$ positioning occasion.

To further improve hearability of PRS, positioning subframes may be low-interference subframes that are transmitted without user data channels. As a result, in ideally synchronized networks, PRSs may receive interference from other cell PRSs with the same PRS pattern index (i.e., with the same frequency shift), but not from data transmissions. The frequency shift, in LTE, for example, is defined as a function of the Physical Cell Identifier (PCI) resulting in an effective frequency re-use factor of 6.

Because of muting, in LTE, signal strengths are often a function of both the Physical Cell Identifier (PCI) and time (the number of slots in the muting mask). Accordingly, with LTE's time-slotting of CRS/PRS signals, there may be multiple different noise floors, which may be set by either the strongest cell within each group, or by thermal noise, where no strong interferer exists.

The PRS configuration parameters such as the number of consecutive positioning subframes, periodicity, muting pattern, etc. may be configured by network 130 and may be signaled to MS 120 (e.g. by server 150) as part of location assistance data, which may comprise OTDOA/AFLT assistance data. In some embodiments, the location assistance data may be processed by a Position Determination Module (PDM) and/or Positioning Engine (PE) on MS 120. For example, LPP or LPPe messages between MS 120 and server 150 may be used to transfer location assistance data, including OTDOA assistance data. OTDOA assistance data may include reference cell information and neighbor cell lists. The reference cell and neighbor cell lists may each contain the PCIs of the cells as well as PRS configuration parameters for the cells.

OTDOA assistance data are usually provided for one or more "neighbor cell" or "neighboring cells" relative to a "reference cell". For example, OTDOA assistance data may include "expected RSTD" parameters, which provide the MS information about the RSTD values the MS is expected to measure at its current location together with an uncertainty of the expected RSTD parameter. The expected RSTD together with the uncertainty defines then a search window for the MS where the MS is expected to measure the RSTD value. "Expected RSTDs" for cells in the OTDOA assistance data neighbor cell list are usually provided relative to an OTDOA assistance data reference cell. OTDOA assistance information may also include PRS configuration information parameters, which allow a MS to determine when a PRS positioning occasion occurs on signals received from various cells, and to determine the PRS sequence transmitted from various cells in order to measure a TOA.

In some embodiments, location assistance data, which may comprise a plurality of map layers, may include location specific transmitting pattern information. For example, information pertaining to each unique transmitting pattern in the network that is available at a location may be specified as part of location assistance data. In one embodiment, maps may include a transmitting pattern layer to indicate unique transmission patterns in a region comprising a coverage area(s)/sub-area(s) for one or more antennas.

In instances where the transmitting pattern data may be large and/or the resources to receive/store the transmitting pattern data are unavailable, the transmitting pattern information in maps may be reduced using multiple regression techniques and/or tailored based on the aggregated data. For example, in some embodiments, the multiple regression techniques may emphasize accurate capture of low frequency trends. In some embodiments, the location assistance data transmitted to MS 120 may be compressed using an appropriate data compression technique prior to transmittal.

In some embodiments, a multipath map may identify locations with high multi-path. In some embodiments, for example, in situations with low multi-path, the magnitude of the multi-path may be provided to enable accurate calibration and removal. In some embodiments, where the estimated location of MS 120 places MS 120 near the edge of a multi-path region with high multi-path one side and a clean signal on the other, then, absolute signal strength measurements, which may be provided as part of map layer information, may be used by MS 120 to determine whether it is within the long shadow region 540, or outside.

Figure 6:
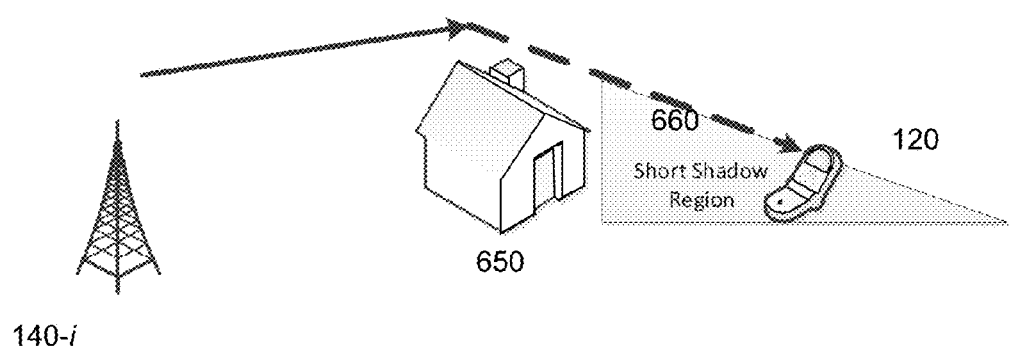
FIG. 6 shows an MS in the shadow of a small obstruction, with signals are received in the short shadow region.

FIG. 6 shows MS 120 in the shadow of a small obstruction 650, where signals are received in the area labeled short shadow region 660. When the obstruction is small, such as when a house, tree, hill, or other relatively small obstruction blocks the direct path, the indirect path may be less than a Pseudorandom Noise (PN) chip length longer. The terms "chip" "PN chip" or "chip sequence" refer to a spreading-code sequence also known as pseudorandom noise, which modulates data symbols to obtain Direct Sequence Spread Spectrum (DSSS) signals. Accordingly, a "fat path" condition may arise because there may be two or more multipath components separated by less than one PN chip.

In some embodiments, a multipath map may comprise a short shadow map layer, which may indicate short shadow regions for a given area. For example, in a residential neighborhood, there may be areas with relatively open line of sight and those with high likelihood of short shadows. To the extent that open streets are aligned with a signal travel direction, they may provide higher probability of direct line of sight. On the other hand, a row of houses may provide an elongated short shadow region, or, if there are spaces between the houses, an intermittent shadow/non-shadow region.

Additionally, in some embodiments, absolute signal power information associated with the estimated location of MS 120 may be used to characterize the bias and spread of the multipath, upon detection that MS 120 is in a short shadow region 260. Because of the short shadow, relative signal strength may likely be blurred in short shadow region 260. For example, the signal strength of a different cell may be unimportant relative to the multipath of the cell of interest because both cells may have the same attenuation, whether in the shadow, or not. In some embodiments, MS 120 may select parameters to be measured and/or weight parameters used in location determination based on information in the location assistance data. For example, in some embodiments, relative signal strength may be given less or no weight in situations where MS 120 is determined to be in short shadow region 260.

In some embodiments, the elevation angle of the signal, relative to the local terrain, will determine the length of shadows, and therefore their relative size. Thus, topology and/or building map databases may be used to create an a priori map of likely shadow regions. In some embodiments, short shadow regions may be inferred or refined using crowdsourced feedback. A priori map creation based on external databases which use topological features to determine short shadow regions, long shadow regions etc may be performed offline.

In some embodiments, multipath maps may include a layer comprising short shadow maps. In some embodiments, short shadow maps may include fine timing granularity information. For example, fine timing granularity may be provided where short shadows result from objects that would induce less than one full chip of delay in the signal.

For LTE, chip widths are relatively small, so that, in some embodiments, short shadow maps may include small areas around urban transmitters and relatively broad areas around suburban and rural transmitters. In some embodiments, large swaths of forest may be considered short shadow areas, because the signal tends to travel along the tops of trees and then down into the forest where the mobile happens to be. In some embodiments, the maps may include openings in the forest where Line Of Sight (LOS) conditions apply, or there may be long shadow areas, which may be created by hills or other topographic features.

There may be various unpredictable factors that affect signal strength and multipath. For example, device orientation, which may be unknown, may impact antenna gain. In some instances, the user's body may block some fraction of signals in some directions around the mobile device. In some embodiments, signal strength (absolute and/or relative) and/or measured antenna gain relative to expected antenna gain may be used by MS 120 to distinguish device orientation from a body blockage situation. Moreover, the ability to receive a given signal may depend not only upon the body blockage between mobile and its cell antenna, but may also depend upon the body blockage between the mobile and the strongest interfering cell (e.g. with the same PCI mod 6) that happens to be transmitting in a given muting slot. In such a situation, visibility and, to some extent, the expected multipath, may depend upon the muting slot, and add a time varying factor to the multipath and visibility maps. In some embodiments, unpredictable factors such as those described above may be modeled in a manner similar to short shadows. Body blockage may create a similar multipath effect to the blockage of a structure, and can be inferred in a similar way. Thus, it may be useful to have different NLOS and LOS layers of the spatially variable FLC map, as well as a map of expected LOS signal strengths, such that the appropriate spatially variable FLC map layer may be selected. It should be noted that signal strengths may be reported in terms of absolute power (e.g. dBm) or relative power such as a signal to noise ratio (e.g. SNR, Ec/Io, C/No, etc.)

In some embodiments, MS 120 may receive signals from multiple distinct paths and these multiple paths may be recorded. For example, when MS 120 is indoors or body-masked, the stronger path may be received. Thus, MS 120 may associate calibrations with that particular path. In conventional systems, mobile stations may typically select the earliest separable path for measurements. In some embodiments disclosed herein, for mapping purposes, MS 120 may select and take measurements of multiple paths. For example, in one implementation, both the earliest arriving signal path and the strongest signal path may be selected for measurement, if they are different.

In some embodiments, information in maps provided to MS 120 may include an indication of one or more of: the likelihood of detection of a signal, its likely accuracy at estimated position of MS 120 along with an estimate of the initial position uncertainty of MS 120. Further, in some embodiments, the maps provided to MS 120 may also include an indication of one or more of: the likelihood of LOS conditions, the lack of long multipath conditions, and/or a determination of whether MS 120 lies in a long or short shadow region. The map may include simple annotations such as eNodeB antenna location, antenna pattern and output power, such that the mobile may perform a simple link analysis with a first order model. Further, the map may contain differences between this first order model and a more localized model, containing higher order correction terms.

In some embodiments, MS 120 may use the information provided to determine an acquisition strategy to obtain a signal fix. In some embodiments, MS 120 may select parameters to be measured, signals to be acquired, and/or weight parameters used in location determination based on information in the location assistance data. For example, if the initial position uncertainty of MS 120 is high, MS 120 may use an average value, averaged over the region of uncertainty. In some embodiments, a weighted average may be used. As another example, MS 120 may prioritize the search for and/or measurement of signals with the broadest coverage within the serving cell coverage area. For example, where a large "boomer" serving cell is present along with several smaller cells within the coverage area of the boomer cell, MS 120 may search for and/or measure the "boomer" cell signal, which has the broadest coverage within the serving cell coverage area. On the other hand, if a small portion of the serving coverage area is not covered well by only these larger cells, then, based on the position uncertainty, MS 120 may select an acquisition strategy that searches for and/or measures signals from a few cells within this smaller region. In some embodiments, an emphasis may be placed upon searching for and/or measuring signals from close-in cells and/or those with high elevation angles, based, at least in part, on the estimated position and position uncertainty of MS 120.

In some embodiments, MS 120 may use the information in the maps provided, in conjunction with the likelihood of broad short shadow signal usability, LOS conditions, and/or lack of long multipath conditions to select a strategy for positioning determination. For example, if positioning accuracy constraints allow for broad usage of short shadow signals, then MS 120 may select to use short shadow signals. Otherwise, LOS signals may be used. In some embodiments, the multi-path maps may include an LOS layer or LOS information indicating locations where LOS conditions are likely with respect to one or more antennas.

For example, MS 120 may select a more refined map layer, or refine the mix of map layers, as more information becomes available for a fix. For example, if after a first iteration (based on the initial estimated position) of refining a position and environment estimate, the likelihoods of having line of sight to a plurality of transmitters may be determined and those likelihoods compared to determine the priority order with which to search for signals from each of the plurality of transmitters. Signals with a low priority may therefore not be searched for at all, or they may not be searched for as often, or for as long. In a further embodiment, the probability that a specific measurement was line-of-sight may be determined from a combination of the measurement signal strength, other measurement characteristics, and the LOS signal strength map. For example, it may be determined that a device is 90% likely to have line of sight to a given transmitter. And so the spread of errors in the line of sight FLC map may be given greater weight than that of the long multipath or short multipath map.

In some embodiments, MS 120 may also use various other considerations in conjunction with the use of multipath information in the maps when determining a strategy for signal acquisition/measurement/reporting. For example, MS 120 may use its recent signal acquisition history to determine which signal to acquire/measure. As an example, in an on-going navigation scenario, the position of MS 120 is likely to be relatively well-known and a signal acquisition history is likely to be available. Thus, some combination of this signal acquisition and signal accuracy history may be used in concert with a multipath map to determine how often the mobile may choose to search for a given signal, what corrections to apply, the associated aggregate measurement uncertainty, and therefore what weight to assign to each measurement.

In situations, where the position of MS 120 is relatively well-known, accuracy is likely to be more important. Therefore, MS 120 may use a refined and/or more detailed map of the local environment, including, for example, the distribution of errors likely to be seen at different locations within a given locale, the co-visibility of certain sets of measurements their relative accuracies, etc. For example, on one side of a building, LOS conditions may exist to all cell antennas out a window or even, effectively, through a wall, while Non Line of Sight (NLOS) conditions may exist for those cell antennas on the other side of the building. Within the building, relative signal strengths may be similar to what might be observed while standing upon the roof, for example, but absolute signal strengths might all be somewhat lower. The likelihood of being inside the building may therefore be inferred from these absolute and relative signal levels. This information may then be used to, for example, select the more localized indoor map of the respective structure. The indoor map may provide, for example, attenuation values through a plurality of surfaces of the structure, along with the relative and/or absolute locations of such surfaces. NLOS conditions may create a significant bias in the position of the mobile device. Thus, the mobile may choose to give more weight to acquiring/measuring/navigating from the set of measurements that are most likely to be LOS in a given situation. In some embodiments, MS 120 may make a LOS vs. NLOS determination based upon signal attenuation relative to expected power at the estimated location of MS 120, or based upon the SNR relative to the expected SNR at said location, and/or based upon the value of SNR. In some embodiments, MS 120 may also select to acquire/measure/use NLOS measurements, where signal strength is adequate and may apply bias corrections to the NLOS measurements, according to previously observed biases at said location, as may be indicated on multi-path/FLC maps.

In instances where MS 120 is static and/or acquiring a first "cold" fix, MS 120 may attempt to acquire/measure signals based upon measurements last seen at the estimated MS location. In some embodiments, MS 120 may determine whether to consume power and acquire/measure additional signals based upon its measurements of the signals last seen at the estimated MS location. For example, if the measurements by MS 120 indicate a high probability that the mobile is still static or unlikely to have moved far, then the mobile may then consume the power required to acquire/measure only the additional signals necessary to confirm the device is not likely to have moved substantially. This tactic may be used, for example, when a user is carrying a device in a pocket, but staying within a certain room or sitting in a relatively fixed position.

In general, when using an a priori position estimate, MS may use one or more of: (i) expected visibility from a visibility map layer; or (ii) expected accuracy from a forward link calibration information layer to search for signals based on the priori location of MS 120. Further, the a priori MS position estimate may be based on one or more of the following types of a priori positions: (i) a historical record of a recently estimated MS location; (ii) an association with the transmitter ID of one or more almanac entries representing bounding coverage area information, which in some instances, may be scaled by recently observed signal strength; (iii) one or more GNSS or hybrid GNSS/Terrestrial/Sensor fixes; and/or (iv) contextual clues such as "indoor vs. outdoor," which may be determined by MS 120, for example, based on association with and/or visibility (or lack thereof) of signals from one or more Wireless LAN Access Points (APs)); "noisy vs. quiet", "static vs. dynamic", "new environment vs. known environment", etc.

For example, the level, type or signature of noise in the environment of the mobile may be used to determine the environment type or the specific environment it is likely to be in. A moving car, for example, has certain road and engine noises that are different from when it is static (i.e. not moving). The device may infer from these noises that the device is in a vehicle moving at a certain speed and/or accelerating at a certain rate. However, road noise may be substantially different on different road surfaces. These variations in road noise may be mapped and provided to the mobile device. For example a series of bumps or textures in the road bed may be spaced at a certain distance, such that a distinct signature can be formed as the vehicle passes over them. From the receipt and correlation of sounds and previously mapped data, the device may be able to infer position and even velocity. Likewise, the typical noises in any given environment may be categorized and provided in a map. For example, "high wind", "fans", "running refrigerator or compressor", "dishwasher", "speakers" (car stereo, television, etc.), "running water", "crashing waves", "magnitude, delay and/or spread of echoes". The frequency, magnitude, periodicity, or other characterizations of the noticeable sounds in any given environment may be provided, or a short clip of the sounds, themselves, such that the device may correlate its own received sounds against them. A signature of the sounds as a function of such factors as time of day, day of week, day of year, weather patterns (precipitation, temperature, wind speed) may also be provided. For example, on a cold day, furnace fans may be more likely to be on, as well as in the early morning, unless a user has a programmable thermostat that allows the temperate in the structure to fall lower at night. Thus, although it may be difficult to measure accurate air temperature with a mobile phone, it may be possible to infer likely sounds from the known weather pattern in a given environment.

In one embodiment, devices may observe measurements differently when they are static (which implies an unmoving device) vs. dynamic. In such cases, some devices may, for example, use accelerometers to determine if static, and therefore turn off or reduce the positioning measurement rate to save power. Thus, there may not be many measurements received while the device is static, if these measurements are taken in the background, when the device just happens to be using positioning services. However, measurements taken while static are likely to be more biased by multipath than those which are taken while dynamic and therefore taking an average of signals received over a variety of device positions. In a typical indoor environment, the noisiness and bias behavior of the measurements may be quite different, and thus it is important to distinguish between measurements taken while static and while dynamic. These differences may be embodied in different map layers or as an annotation of the differences between static and dynamic in a given environment. Furthermore, these differences may be provided as a function of the speed or velocity of the device.

In a further embodiment, when a device is in a "new" environment, it may choose to perform different functions than when it is in a "known" environment. An environment may be "known" if the device has been there before and collected information about that environment, or it may be known because MS 120 has a map of the environment provided by the network or a different user. There are different levels of "knowledge" about an environment. It may be known on a variety of different levels or layers, ranging from street map, structural "3D" map, floor plan, signal delays, signal strengths, signal attenuations, or any of the other contextual clues described herein. When a device detects that a desirable map layer is not available, it may be considered as being in a "new" environment and therefore choose to collect desired characterization data. When it is in a known environment, it may choose to request from the network a list of specific map layers for its use and it may also choose to download one or more of these layers based upon need and expected benefit, as described in IDF 092921.

MS 120 may use the calibration map layers to determine an a priori measurement uncertainty and weight any measurements in a navigation solution, where the measurements may be timing or signal strength-based.

Table 1 below summarizes typical characteristics for the exemplary multipath and visibility information discussed above. As indicated in Table 1, where Line of Sight conditions exist with respect to an antenna, signal attenuation is typically low, spatial variability of FLC values within the LoS region is low, and the FLC values are typically unaffected by the muting slot. For an MS 120 in a short shadow region, signal attenuation is medium, induced multipath effects cause less than one full chip of delay in the signal, spatial variability of the signal is high, and the FLC values are typically unaffected by the muting slot. For MS 120 in a long shadow region signal attenuation is high, induced multipath effects cause more than one full chip of delay in the signal, spatial variability of the signal is low and the FLC values are typically unaffected by the muting slot.

TABLE 1

Summary of Typical Multipath/Visibility Characteristics

| Type | Attenuation | Multipath | Spatial Variability | Time Dependence (Muting Slot) |
|---|---|---|---|---|
| LOS FLC | Low | Low | Low | No |
| Short Shadow FLC | Medium | <1 chip | High | No |
| Long Shadow FLC | High | >1 chip | Low | No |
| Body Blocked FLC | High | Varies | N/A -- Effectively binary | No |
| A priori visibility | N/A | N/A | High | Yes |

In instances where body blockage occurs between mobile and a cell antenna, signal attenuation may be high, multipath may vary, and spatial variability may be high and sensitive to where body blockage occurs. Further, strength may also depend upon the body blockage between the mobile and the strongest interfering cell (e.g. for LTE PRS with the same PCI mod 6) that happens to be transmitting in a given muting slot, which may add a time varying factor to FLC values in the multipath and visibility maps. In situations where the device orientation, gait and/or carriage is determined, it may be possible to predict the likelihood of body blockage based upon such factors as the estimated line of sight to each transmitting antenna and the likely user body position, relative to the device. These likelihoods may then be used to determine the likelihood of a signal being received and, furthermore, its likely accuracy.

In situations, where MS uses an a priori position estimate along with information from one or more map layers, there may significant variability in FLC values as well as time dependence of the FLC values in the multipath and visibility maps. The variability may be dependent, at least in part, on the variance of the FLC values across the a priori position uncertainty region.

In some embodiments, various other methods may be used to distinguish the different layers of a multipath map. For example, the entire map may be expressed as a function of one or more of: relative or absolute signal strength, attenuation, device type, body or other unpredictable blockage, muting pattern or slot, and/or other discriminating factors relative to a current/estimated position or environment of MS 120 such as the aforementioned contextual clues. In general, maps consistent with disclosed embodiments may be used in conjunction with any positioning method used by MS 120. The device may choose to scan the environment for measurements or clues, only requesting relevant map layer information when it is likely to be of benefit, or it may choose to download all relevant map layers within a certain range of its present environment. It may also choose to download coarser granularity maps along a planned or predicted route, downloading finer granularity map information only when the device is more likely to benefit from the finer map layer. The downloading process may be planned to account for the availability of communication resources in a given environment. For example, a device may choose to download more map data while in the vicinity of a lower-cost communications resource than when a higher cost resource may be necessary. Or the device may choose to download more map data when the device is likely to enter into an area with lower communication resource availability. And the device may download finer granularity information for environments with poor or expensive communications resources than it would otherwise have downloaded if there were readily available communication resources in the area. For example, a user may plan to travel a certain route after arrival at an airport in a country in which the user does not have mobile data service. The device may download the necessary map information to cover the planned route before the user leaves the highly available communications coverage area. Communications coverage areas, then, may be a further layer to the maps described herein, including availability and cost information.

A plurality of map layers with such attributes as observed absolute signal strength, observed relative signal strength, observed long multipath, observed long multipath, observed body blockage, likelihood of line of sight, likelihood of long multipath, likelihood of short multipath, observed visibility, communications coverage areas, which may include associated cost information may be provided to MS 120 as assistance data. In some embodiments, the maps may represent, on at least one layer, the bias and spread of expected forward link timing errors, relative to the timing of a line of sight signal. In some embodiments, one or more of the map layers may hold spatially-variable information corresponding to the information in the map layer. For example, an RSSI map layer may provide spatially-variable RSSI information at a position granularity associated with that map layer. In general, the techniques disclosed herein are not limited to spatially variable FLC maps and/or map layers but may be used to specify other signal characteristics and/or in conjunction with the use of FLC map layers. Moreover, BSA information for the other layers may also be obtained by crowdsourcing the information, based on observations/measurements by a plurality of MS' 120.

In some embodiments, based on the acquisition strategy selected, MS 120 may request and/or receive, as location assistance data, one or more map layers of interest for selected transmitters and/or antennas in a region of interest from a network entity. Further, MS 120 may provide measurement feedback to a network entity for aggregation of the measurements with stored data such as BSA data.

Selecting a more refined map layer, or refining the mix of map layers, as more information becomes available for a fix. For example, after a first iteration, refining a position and environment estimate, it may be determined that a device is 90% likely to have line of sight to a given transmitter. And so the spread of errors in the line of sight FLC map is given greater weight than that of the long multipath or short multipath map when determining the expected measurement error. In a further embodiment, the expected LOS signal strength will be given greater weight when determining the expected signal strength. The expected measurement error and expected signal strength may both be used to determine whether or not to search for a given measurement. The expected measurement error may be used to determine the likely contribution to the location determination process. The expected signal strength may be used, at least in part, to determine the measurement availability. Furthermore, it may also be appropriate for the device to determine an estimated measurement "cost", in terms of time to fix, power usage and the like, and this cost may be weighed against the expected benefit in terms of expected accuracy improvement.

Figure 7:
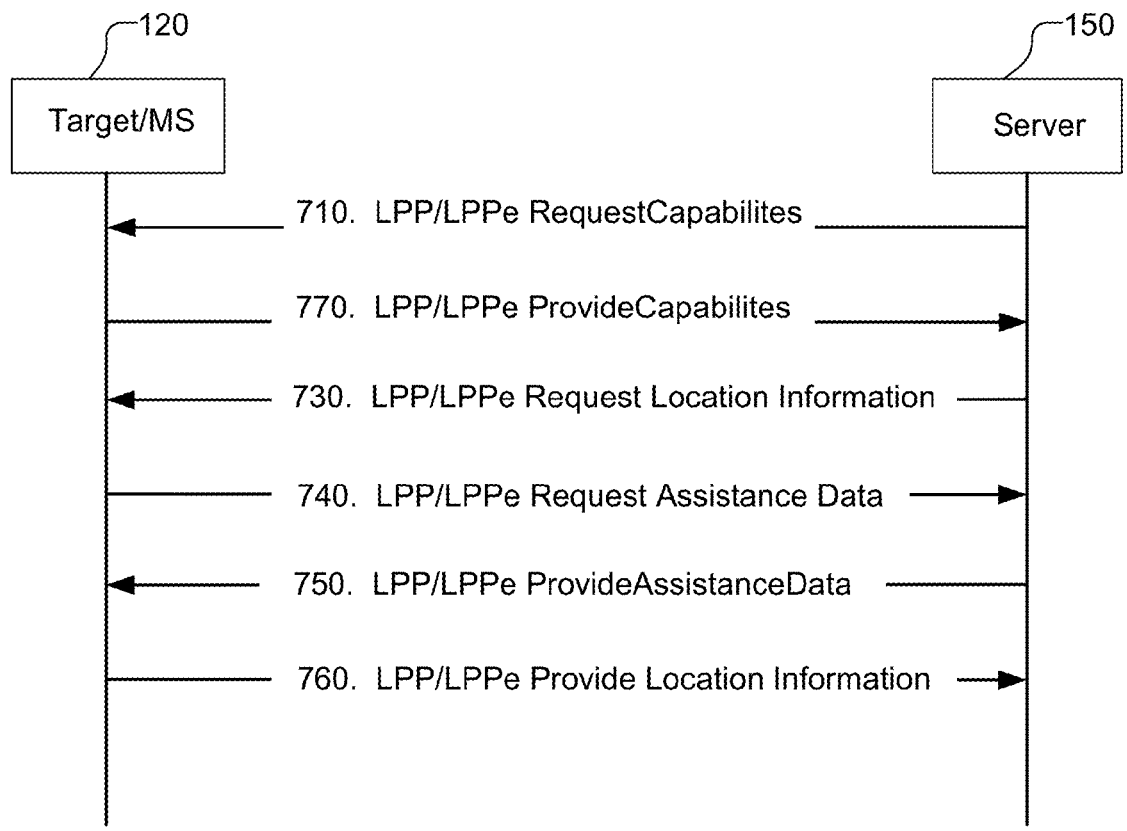
FIG. 7 illustrates an exemplary message flow that supports transfer of assistance data from a server to an MS and the transfer of location related information from the MS to the server 150.

FIG. 7 illustrates the message flow of a basic procedure that supports transfer of assistance data from the server 150 to the MS 120 and transfer of location information (e.g., RSTD measurement) from MS 120 to server 150 using a connection and, where applicable, a location session between the MS 120 and server 150 that remains established during the entire data transfer. For the sake of example, the message flow is described as LPP/LPPe positioning protocol messages, but it should be understood that other types of messages may be used if desired (e.g. LPP or other messages in accordance with the protocol being used for the location session).

In step 710, if the LPP/LPPe/assistance data capabilities of MS 120 are not known to server 150, then, in some embodiments, server 150 may send an LPP/LPPe Request Capabilities message to MS 120. The Request Capabilities message, which requests the LPP/LPPe capabilities of the MS 120, may include, among other parameters, a request for MS capabilities pertaining to location assistance, which may include capability indication pertaining to the types/forms of assistance data that MS 120 may be capable of processing. For example, the Request Capabilities message may be used to determine if MS 120 is capable of processing location assistance data such as layered map assistance data, spatially variable FLC maps/models, etc.

The MS 120 may respond with a LPP/LPPe Provide Capabilities message sent to the server 150 in step 720 of the message flow. In some instances, the Provide Capabilities message may be provided by MS 120 unsolicited in step 720 in the absence of a Request Capabilities message being sent in step 710. In another embodiment, the Provide Capabilities message in step 720 may be sent instead by MS 120 in association with a request for assistance data sent later in step 740. In some embodiments, the Provide Capabilities message may include, among other parameters, an indication of MS location assistance data capabilities, including capability indication pertaining to the capability to process layered map assistance data, spatially variable FLC maps/models, etc.

Steps similar to steps 710 and 720 but with message transfer in the opposite direction may be performed instead of step 710 and 720 or in addition to steps 710 and 720 to transfer the LPP/LPPe capabilities of server 150 to MS 120 regarding support for location assistance capabilities, including capability indication for layered map assistance data, spatially variable FLC maps/models etc. These steps are not shown in FIG. 7 and, if used, may make use of a reversed LPPe mode whereby a MS 120 is enabled to request and receive capabilities from a server 150.

In step 730 of the message flow, the server 150 requests location information from MS 120 in a LPP/LPPe Request Location Information message. The request for location information may include a request for RSTD/OTDOA and/or other signal measurements to be performed by MS 120. In some embodiments, the measurements requested may be dependent on the capabilities of MS 120 and/or information for server 150 to update and/or augment BSA data.

In some embodiments, MS 120 may request assistance data in order to fulfill the request received in step 730 and may send an LPP/LPPe request for assistance data to the server 150, in step 740. In some embodiments, MS 120 may specify the particular assistance data requested, such as location assistance data, which may include layered map assistance data and/or OTDOA assistance data, which may further include one or more of PRS assistance information, and/or muting information. In some embodiments, step 740 may not occur and the server 150 may decide to send location assistance data to MS 120 unsolicited. In some embodiments, MS 120 may send a coarse estimated location along with the request for assistance data in step 740.

In step 750 of the message flow, server 150 may obtain the assistance data to be transferred to MS 120. If step 740 was performed, the assistance data may comprise all of the assistance information requested by the MS 120 that may be available to server 150. The assistance data transferred in step 750 may include the location assistance data, layered map assistance data and/or OTDOA assistance data defined in LPP/LPPe and may also include other location assistance information. In some embodiments, the assistance data sent to MS 120 in step 750 may be based on a coarse estimated location of MS 120, which may be obtained/determined by server 150 and/or sent previously by MS 120.

The MS 120 may select a signal acquisition strategy to measure signal parameters such as RSTDs between a reference cell and multiple neighbor cells based on the assistance data received in step 750. In some embodiments, MS 120 may utilize information included in the assistance data to determine the RSTDs and/or make other measurements as described above.

Once MS 120 has determined all measurements as requested by the server 150 in step 23, such as RSTD measurements for example, it may send the measurements in an LPP/LPPe Provide Location Information message to server 150 in step 26. The LPP/LPPe Provide Location Information message in step 26 may include the RSTD measurements together with an identification of the measured cells/transmitters/antennas, such as the Physical Cell Identifier for which the RSTDs and/or other measurements are being provided.

In some embodiments, server 150 may use the received measurements along with information of the antenna locations from which the MS has performed the measurements as well as BS timing information to calculate the location of MS 120. In some embodiments, the measurement information from MS 120 may be aggregated with and/or used to augment information in a BSA and/or a calibration database. Server 150 may also provide the calculated location of MS 120 to LCS client 160, for example (not shown in FIG. 2).

In some embodiments, MS 120 may use the measurements together with information of the antenna locations from which the MS 120 has performed the measurements as well as BS timing information to calculate the location of MS 120 and may report the estimated location to server 150, which may the aggregate and/or augment the measurement information received from MS 120 with information in a BSA and/or a calibration database.. In some embodiments, server 150 may provide the MS location information to LCS client 160.

Figure 8:
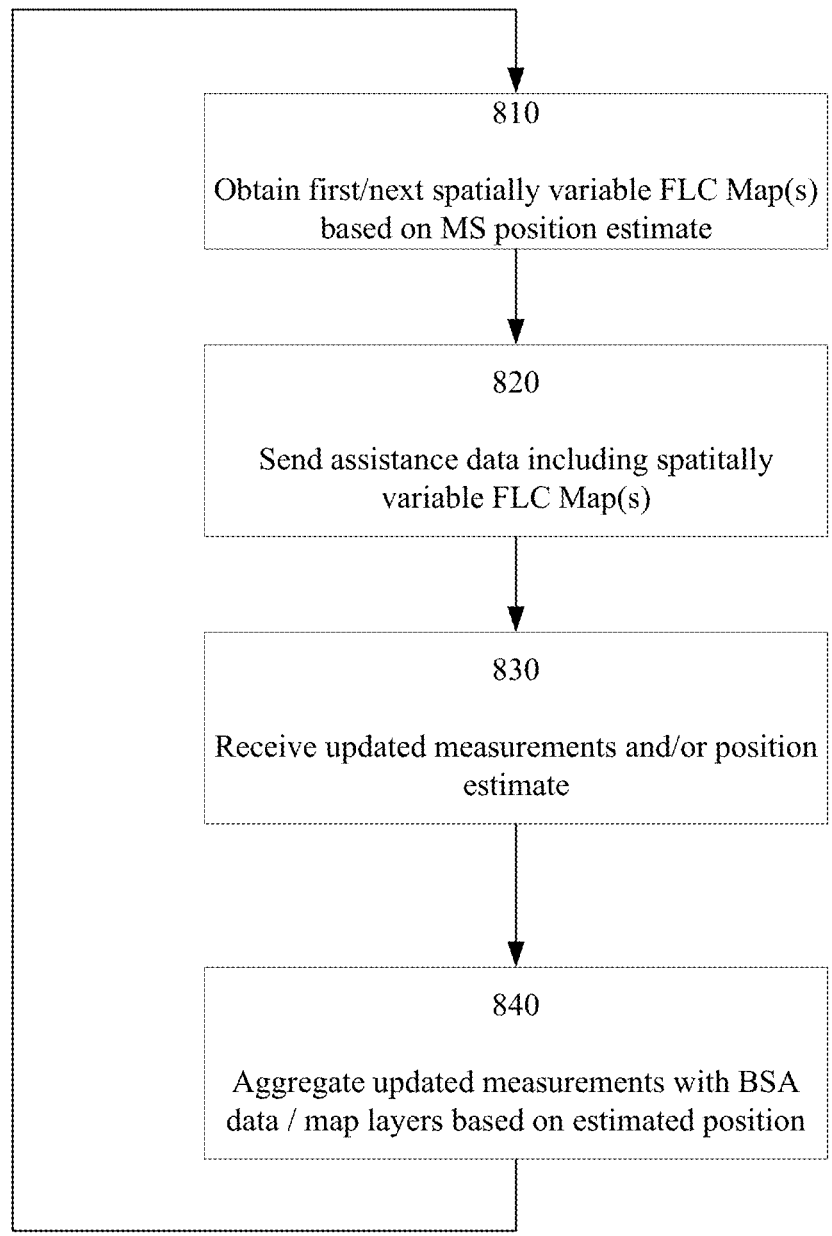
FIG. 8 shows a flowchart of an exemplary method for aggregating and/or augmenting a BSA using crowdsourced measurements from MSs in a manner consistent with disclosed embodiments.

FIG. 8 shows a flowchart of an exemplary method 800 for aggregating and/or augmenting a BSA using crowdsourced measurements from MSs 120 in a manner consistent with disclosed embodiments. In some embodiments, method 800 may be performed by one or more servers 150.

In step 810, based on an estimated position of an MS 120, map data pertaining to the estimated position of MS 120 may be obtained. In some embodiments, the map data may comprise spatially variable FLC values, which may be associated with layers of increasing position granularity. In some embodiments, the maps may comprise information and/or layers pertaining to absolute signal strength, observed relative signal strength, observed long multipath, observed short multipath, observed body blockage, likelihood of line of sight, likelihood of long multipath, likelihood of short multipath, observed visibility, and timing/muting pattern information for antennas in an area around MS 120. In some embodiments, the maps may represent, on at least one layer, bias and spread of expected forward link timing errors, relative to the timing of a line of sight signal.

In step 820, in some embodiments, one or more of the map layers may be sent to the MS 120 based, in part, on the capabilities of MS 120 and/or the information requested by MS 120 and/or information available to server 150. In some embodiments, the map layers may comprise spatially variable FLC values and/or OTDOA assistance data.

In step 830, updated measurements pertaining to a location of MS 120 may be received. For example, MS 120 may select a signal acquisition strategy based on the assistance data sent by the server in step 820 and may perform signal measurements. Further, MS 120 may use the spatially variable FLC data, updated signal measurements and map layer assistance data to obtain its position and a position uncertainty. In some embodiments, the updated measurements, position estimate and position uncertainty may be received in step 830.

In step 840, the updated measurements, position estimate and/or position uncertainty may be used to update BSA data. In some embodiments, the information in the BSA may be correlated to the position (and position uncertainty) of MS 120. In some embodiments, the correlation and aggregation of a measurement set by MS 120 with position may occur at various levels of position granularity based, at least in part, on the position uncertainty. For example, a single measurement set by MS 120 at a measurement location may be associated with a hierarchy of position granularities from a fine granularity (which may be determined based on the position uncertainty) to increasingly coarser position granularities. In some embodiments, each of the hierarchy of positions (which may be specified at different granularities) associated with a measurement set may correspond to a distinct map layer.

Figure 9:
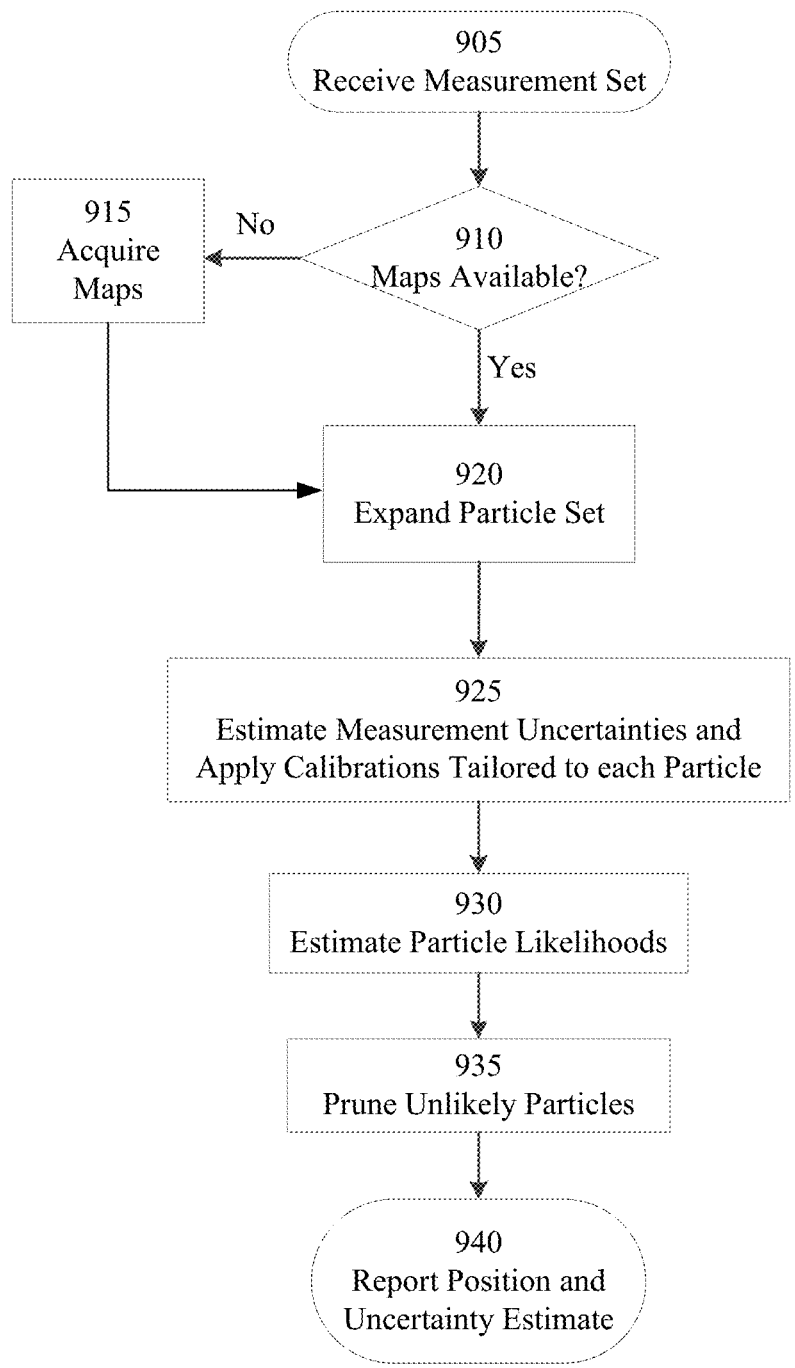
FIG. 9 shows a flowchart of a method for estimating the position and position uncertainty of an MS using a particle filter in a manner consistent with disclosed embodiments.

FIG. 9 shows a flowchart of a method 900 for estimating the position and position uncertainty of MS 120 using a particle filter in a manner consistent with disclosed embodiments. In general, MS 120 or another PDE on network 130 may use a variety of Bayes Filtering techniques to determine its position based on the location assistance information received and the measurements. For example, Kalman filters, particle filters and/or iterative techniques may be used by MS 120 and/or a PDE to determine the position of MS 120 based on the measurement set and location assistance information. The term particle filter is used to refer to recursive implementations of Monte Carlo based statistical signal processing.

In some embodiments, method 900 may be performed by MS 120. In some embodiments, the results of method 900, which may include an estimated position of MS 120 and a position estimate uncertainty, may be sent to server 150, which may comprise a BSA server. In some embodiments, BSA server 150 may update one or more multipath or visibility maps and/or aggregate the resulting information provided by MS 120 with other data, which may also be crowd sourced. Note that said BSA server may be collocated with one or more map servers. All respective map layers are preferably in the same, or readily associable, coordinate system, with their degree of alignment duly noted and provided with the maps. Furthermore, an estimate of the precision of the map (e.g. local accuracy, relative to other map components) may be provided. An estimate of the map orientation, and the accuracy of the orientation may be provided. An estimate of the accuracy of the position registration to a higher, more coarse level, of map or global coordinate system such as WGS-84 may also be provided.

Such registration may be provided relative to a known benchmark location, such as a survey marker or other readily visible landmark.

In step 905, a measurement set may be obtained. For example, in one instance, the measurement set may be received by a PDM or PE in MS 120. In some embodiments, the measurement set may be based on measurements made by MS 120.

In some embodiments, in step 910, a determination may be made whether maps are available for an area comprising the current or future location of MS 120. In some embodiments, the location of MS 120 may be estimated based on an initial position estimate (e.g. centroid of a serving cell-id) or, a recent a priori position estimate, etc., and a determination of whether maps (e.g. multipath maps) are available for the estimated position may be based, in part, on the position estimate. For example, initial position estimate of MS 120 may be used to determine whether multipath/visibility maps are available for that location, or along a planned or likely route. In some embodiments, the maps may take the form of layered maps.

If the multipath/visibility maps are available ("Yes in step 920), then, in step 920, the particle set may be expanded, where each particle represents a hypothesis about a potential or likely position of MS 120. The expansion of the particle set may be in relation to such factors as the amount of time that has passed since the last filter update, the last known speed or velocity, or the last known environment. If the multipath/visibility maps are not locally available ("No" in step 920), then, in step 915, the maps may be acquired (e.g. from local storage, a BSA server and/or another network entity) prior to expanding the particle set in step 320. Each sample of a state vector is referred to as a particle and the particle filter tracks the state of the system by estimating unknown variables such as position over time based on the measurement set. For example, the state of the system may include one or more of position, velocity, etc of MS 120 and may be estimated based on the measurement set. In some embodiments, the maps may take the form of layered multipath and/or visibility maps.

In step 925, measurement uncertainties may be estimated and calibrations tailored to each particle may be applied based upon, at least in part, the particle position and the FLC information for that particular geographic location.

Next, in step 930, particle likelihoods may be estimated. For example, a probability density function (pdf) may be used to estimate particle likelihood based upon the agreement of the observed measurements with what would be expected at the particle position. This agreement may be in the form of a comparison of observed minus predicted range measurements and/or signal strengths, or it may take into account other factors, such as contextual clues. For example, if contextual clues point to the fact that the user is in a quiet location when a lot of noise would be expected, that particle likelihood might be reduced.

In step 935, highly unlikely particles may be pruned by, for example, comparing their likelihood to some threshold likelihood. For example, as a MS 120 travels down a city street, with clear line of sight, it is possible that it may have slowed down or sped up. It is also possible to turn at intersections. And it is possible that the user will have parked his car and taken the device into a low-dynamic/pedestrian mode. In such a mode, there is a likelihood that the device will enter a building or walk along a city street. Each of these probabilities may be tracked and the likelihood for a given particle may be assigned based upon how well it fits past information and the currently received/new information. If the new information does not match well, then the particle may be removed from consideration.

In step 940, a position and uncertainty estimate may be reported. In some embodiments, PDM or PE may report the position and uncertainty estimate to an invoking application (e.g. a navigation application) on MS 120. In some embodiments, the measurement set and/or the position and position uncertainty estimate may also be reported to a server such as a BSA server, which may aggregate the measurements, position and uncertainty estimate provided by MS 120 with stored measurements and update one or more maps based on the updated aggregated data.

Figure 10:
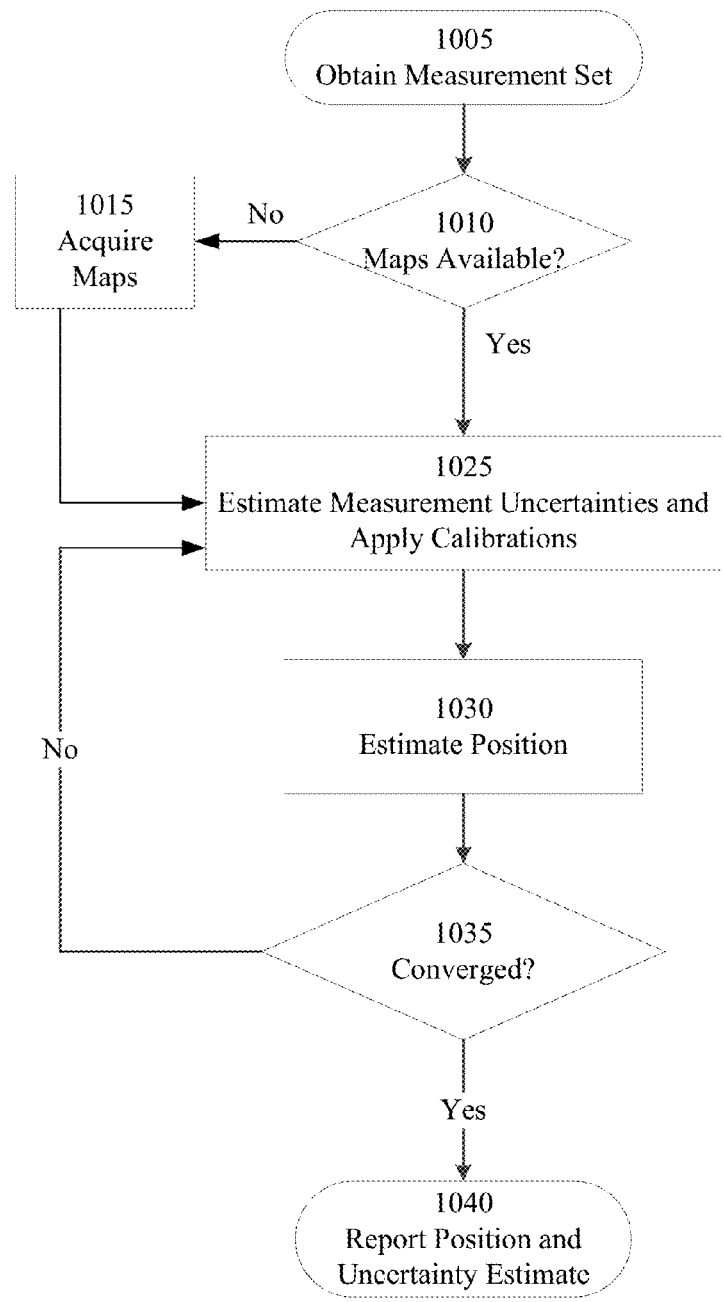
FIG. 10 shows a flowchart of another method for estimating the position and position uncertainty of an MS using an iterative filter in a manner consistent with disclosed embodiments.

FIG. 10 shows a flowchart of another method 1000 for estimating the position and position uncertainty of MS 120 using an iterative filter in a manner consistent with disclosed embodiments. In some embodiments, method 1000 may be performed by MS 120.

In some embodiments, the results of method 1000, which may include an estimated position of MS 120 and a position estimate uncertainty, may be sent to server 150, which may be a BSA server. In some embodiments, the BSA server may update one or more multipath or visibility maps and/or aggregate the resulting information provided by MS 120 with other data, which may be crowd sourced.

In step 1005, a measurement set may be received. For example, in one instance, the measurement set may be received by a PDM or PE in MS 120. In some embodiments, the measurement set may be based on measurements made by MS 120.

In some embodiments, in step 1010, a determination may be made whether maps are available for an area comprising the current location of MS 120.

If the multipath/visibility maps are available ("Yes in step 1020), then, in step 1025, measurement uncertainties may be estimated and calibrations may be applied based on the multipath/visibility maps. If the multipath/visibility maps are not locally available ("No" in step 1020), then, in step 1015, the maps may be acquired (e.g. from local storage, a BSA server and/or another network entity).

In step 1025, measurement uncertainties may be estimated and calibrations tailored to each position estimate may be applied. The tailoring process may involve taking a straight or weighted average of calibration values over the area (or volume) in which the device may be located, based upon the position estimate and its associated uncertainty. More weight may be given to locations where the device is more likely to be, based upon a probability distribution function that falls away as the location considered becomes further from the current position estimate. It may also be based, at least in part, upon the likelihood that a user would be at a given location. For example, a skyscraper might have a higher assigned probability than an undeveloped adjacent desert area. A road with high traffic may be accorded a higher likelihood than a footpath. And a foot path might have higher likelihood than an undeveloped park land.

In step 1030, the position of MS 120 may be estimated, and checked for convergence in step 1035. If the position has converged ("Yes" in step 1035) then, in step 1040, the position and uncertainty estimate may be reported. If the position has not converged ("No" in step 1035) then, the currently estimated position is used to begin another iteration in step 1035. For example, in some embodiments, convergence may be determined based, in part, on comparing the changes in the resulting estimated parameters to threshold values and exiting the iteration process after the amount of change had reached a defined minimum or a maximum number of iterations have occurred.

In some embodiments, PDM or PE may report the position and uncertainty estimate to an invoking application (e.g. a navigation application) on MS 120. In some embodiments, the measurement set and/or the position and position uncertainty estimate may also be reported to a server such as a BSA server, which may aggregate the measurements, position and uncertainty estimate provided by MS 120 with stored measurements and update one or more maps.

Figure 11:
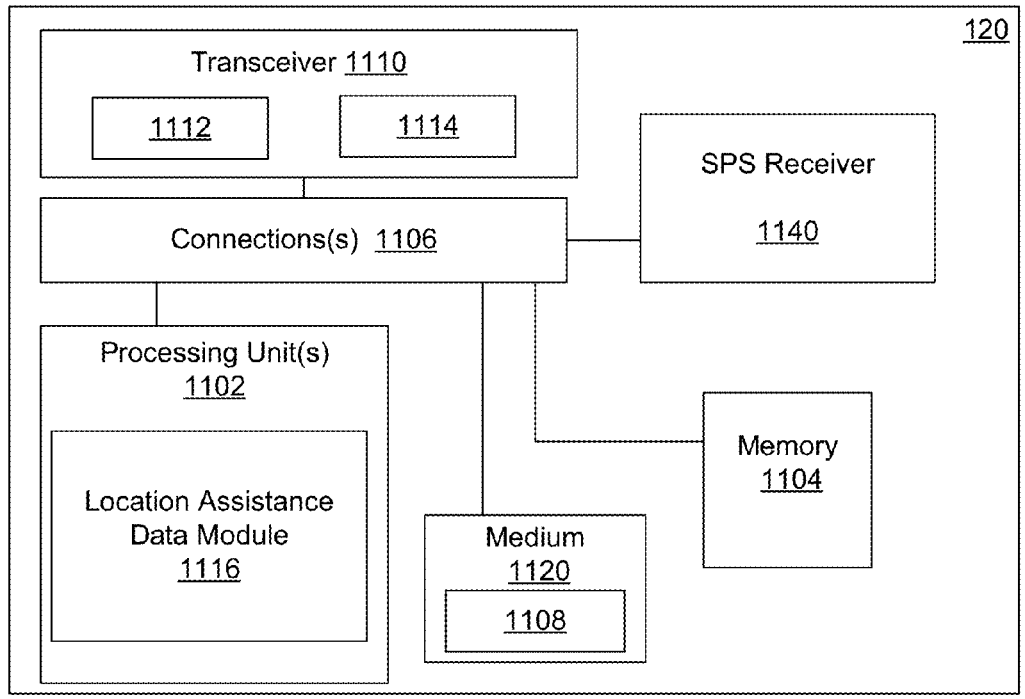
FIG. 11 shows a schematic block diagram illustrating certain exemplary features of MS 120 enabled to support position determination.

FIG. 11 shows a schematic block diagram illustrating certain exemplary features of MS 120 enabled to support position determination. In some embodiments, MS 120 may support location determination using location assistance information based on spatially variable FLC values and/or layered maps in a manner consistent with disclosed embodiments. MS 120 may, for example, include one or more processing units 1102, memory 1104, a transceiver 1110 (e.g., wireless network interface), and (as applicable) an SPS receiver 1140, which may be operatively coupled with one or more connections 1106 (e.g., buses, lines, fibers, links, etc.) to non-transitory computer-readable medium 1120 and memory 1104. In certain example implementations, all or part of MS 120 may take the form of a chipset, and/or the like. The SPS receiver 1140 may be enabled to receive signals associated with one or more SPS resources. Transceiver 1110 may, for example, include a transmitter 1112 enabled to transmit one or more signals over one or more types of wireless communication networks and a receiver 1114 to receive one or more signals transmitted over the one or more types of wireless communication networks.

Processing unit 1102 may be implemented using a combination of hardware, firmware, and software. In some embodiments, processing unit 1102 may include MS Location Assistance Data Module 316, which may process received location assistance data including spatially variable FLC values, layered map information such as multipath and visibility map assistance information, OTDOA assistance information, including PRS assistance information, etc. Further, in some embodiments, processing unit(s) 1102 may further comprise a Position Determination Module (not shown), which may use information derived from measurements by MS 120 either independently, or in conjunction with the location assistance data to determine a position and a position uncertainty estimate for MS 120. For example, MS Location Assistance Data Module 1116 may process location assistance information comprising multipath and visibility map assistance information, PRS timing pattern and/or muting information etc., which may then be used by processing unit 1102 to select a signal acquisition/measurement strategy. In some embodiments, processing unit 1102 may also be capable of processing various other received LPP/LPPe messages including assistance information either directly or in conjunction with one or more other functional blocks shown in FIG. 11. In some embodiments, processing unit 1102 may represent one or more circuits configurable to perform at least a portion of a data signal computing procedure or process related to the operation of MS 120.

In some embodiments, MS 120 may include one or more MS antennas (not shown) which may be internal or external. MS antennas may be used to transmit and/or receive signals processed by transceiver 1110 and/or SPS receiver 1140. In some embodiments, MS antennas may be coupled to transceiver 1110 and SPS receiver 1140. In some embodiments, measurements of signals received (transmitted) by MS 120 may be performed at the point of connection of the MS antennas and transceiver 1110. For example, the measurement point of reference for received (transmitted) RF signal measurements may be an input (output) terminal of the receiver 1114 (transmitter 1112) and an output (input) terminal of the MS antennas. In an MS 120 with multiple MS antennas or antenna arrays, the antenna connector may be viewed as a virtual point representing the aggregate output (input) of multiple MS antennas. In some embodiments, MS 120 may measure received signals including signal strength and TOA measurements and the raw measurements may be processed by processing units 1102.

The methodologies described herein may be implemented by various means depending upon the application. For example, these methodologies may be implemented in hardware, firmware, software, or any combination thereof. For a hardware implementation, the processing unit 1102 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

In some embodiments, processing unit 1102 may also receive input from one or more sensors (not shown in FIG. 11), which may include a variety of sensors, such as an ambient light sensor, acoustic sensors, cameras and/or image sensors, an Inertial Measurement Unit (IMU) etc. The IMU, which may comprise 3 axis accelerometer(s), 3-axis gyroscope(s), and/or magnetometer(s), may provide velocity, orientation, and/or other position related information to processing unit 1102. In some embodiments, the IMU may output measured information in synchronization with the capture of each image frame by the camera, and/or other measurements taken by MS 120. In some embodiments, the output of IMU 130 may be used in part by processor 150 to determine a position and orientation MS 120.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a non-transitory computer-readable medium 1120 or memory 1104 that is connected to and executed by processing unit 1102. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1108 on a non-transitory computer-readable medium, such as medium 1120 and/or memory 1104. Examples include computer-readable media encoded with a data structure and computer-readable media encoded with a computer program 1108. For example, the non-transitory computer-readable medium including program code 1108 stored thereon may include program code 1108 to support AFLT/hybrid-AFLT/RSTD/OTDOA measurement using location assistance information in a manner consistent with disclosed embodiments. Non-transitory computer-readable media 1120 includes physical computer storage media. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code 1108 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium 1120, instructions and/or data may be provided as signals on transmission media included in a communication apparatus. For example, a communication apparatus may include a transceiver 1110 having signals indicative of instructions and data. The instructions and data are configured to cause one or more processors to implement the functions outlined in the claims. That is, the communication apparatus includes transmission media with signals indicative of information to perform disclosed functions.

Memory 1104 may represent any data storage mechanism. Memory 1104 may include, for example, a primary memory and/or a secondary memory. Primary memory may include, for example, a random access memory, read only memory, etc. While illustrated in this example as being separate from processing unit 1102, it should be understood that all or part of a primary memory may be provided within or otherwise co-located/coupled with processing unit 1102. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer-readable medium 1120. As such, in certain example implementations, the methods and/or apparatuses presented herein may take the form in whole or part of a computer-readable medium 1120 that may include computer implementable instructions 1108 stored thereon, which if executed by at least one processing unit 1102 may be operatively enabled to perform all or portions of the example operations as described herein. Computer readable medium 1120 may be a part of memory 1104.

Figure 12:
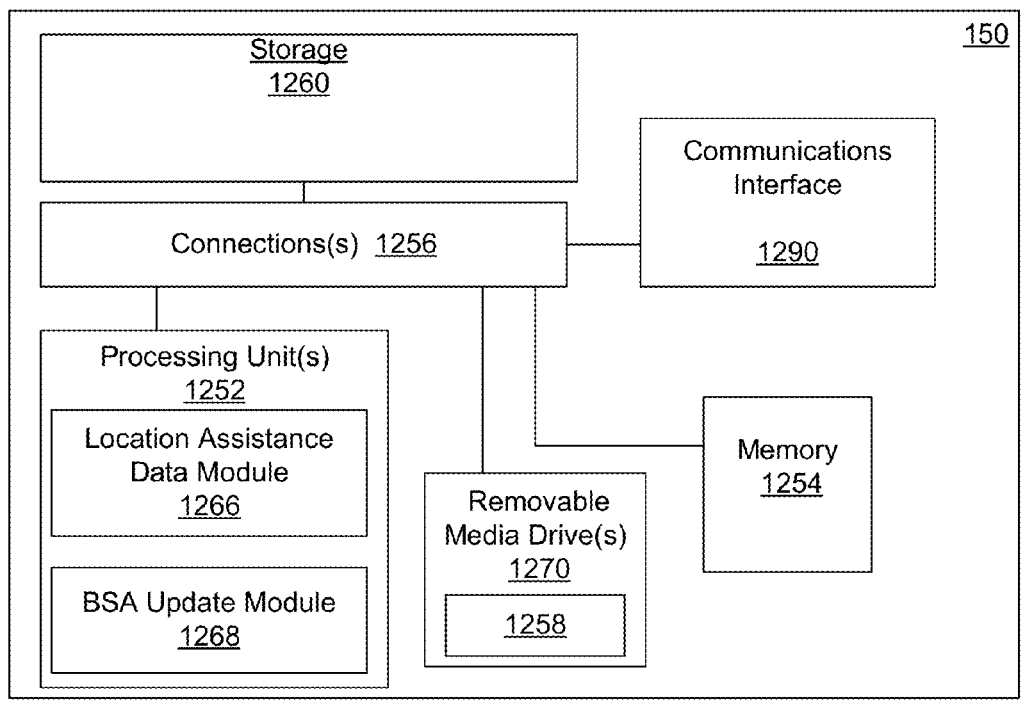
FIG. 12 shows a schematic block diagram illustrating an apparatus such as an exemplary server enabled to support the location determination.

Reference is now made to FIG. 12, which is a schematic block diagram illustrating a server 150 enabled to support enabled to support position determination and crowdsourced forward link calibration. In some embodiments, server 150 may support location determination by providing location assistance information based on spatially variable FLC values and/or layered maps in a manner consistent with disclosed embodiments. Further, in some embodiments server 150 may update a BSA and/or a configuration database based on measurements and information reported by one or more MS' 120 in a manner consistent with disclosed embodiments. In some embodiments, server 150 may include, for example, one or more processing units 1252, memory 1254, storage 1260, and (as applicable) communications interface 1290 (e.g., wireline or wireless network interface), which may be operatively coupled with one or more connections 1256 (e.g., buses, lines, fibers, links, etc.). In certain example implementations, some portion of server 150 may take the form of a chipset, and/or the like.

Communications interface 1290 may include a variety of wired and wireless connections that support wired transmission and/or reception and, if desired, may additionally or alternatively support transmission and reception of one or more signals over one or more types of wireless communication networks. Communications interface 1290 may also include interfaces for communication with various other computers and peripherals. For example, in one embodiment, Communications interface 1290 may comprise network interface cards, input-output cards, chips and/or ASICs that implement one or more of the communication functions performed by server 150. In some embodiments, communications interface 1290 may also interface with network 130 to obtain a variety of network configuration related information, such as PCIs, configured PRS information, and/or timing information used by the base stations in the network. For example, Communications interface 1290 may make use of the LPP annex (LPPa) protocol defined in 3GPP TS 36.455 or a modification of this protocol to obtain PCI, configured PRS, timing and/or other information from the base stations in network 130. Processing unit 1252 may use some or all of the received information to generate location assistance data in a manner consistent with disclosed embodiments.

Processing unit 1252 may be implemented using a combination of hardware, firmware, and software. In some embodiments, processing unit 1252 may include Server Location Assistance Data Module 1266, which may generate location assistance information, including layered maps, with multi-path and visibility information, spatially variable FLC data, PRS timing and muting assistance information, etc. for transmission to mobile stations 120. For example, Server PRS Assistance Data Module 1266 may generate and/or format location assistance information. In some embodiments, Server Location Assistance Data Module 1266 may also generate location assistance information for transmission to mobile stations 120. Processing unit 1252 may also be capable of processing various other LPP/LPPe assistance information either directly or in conjunction with one or more other functional blocks shown in FIG. 12. In some embodiments, processing unit 1252 may generate the location assistance information as Long Term Evolution (LTE) Positioning Protocol (LPP) or LPP extensions (LPPe) messages.

Further, in some embodiments, processing unit(s) 1252 may further comprise a Position Determination Module (not shown), which may use information obtained from measurements by MS 120 to determine a position and a position uncertainty estimate for MS 120.

In some embodiments, processing unit(s) 1252 may also comprise BSA Update Module 1268, which may correlate measurements by MS' 120 with corresponding position estimates and position uncertainty estimates and update one or more BSAs and/or calibration databases. For example, for a measurement received from an MS 120, BSA Update Module 1268 may aggregate the received measurement information with stored BSA data based on the position estimate and/or position uncertainty estimate associated with the measurement. The position estimate and position uncertainty estimate may be either determined by and received from MS 120, determined by server 150 (e.g. by a PDM on server 150), or by another network entity.

In some embodiments, processing unit 1252 may represent one or more circuits configurable to perform at least a portion of a data signal computing procedure or process related to the operation of server 150.

Figure 13:
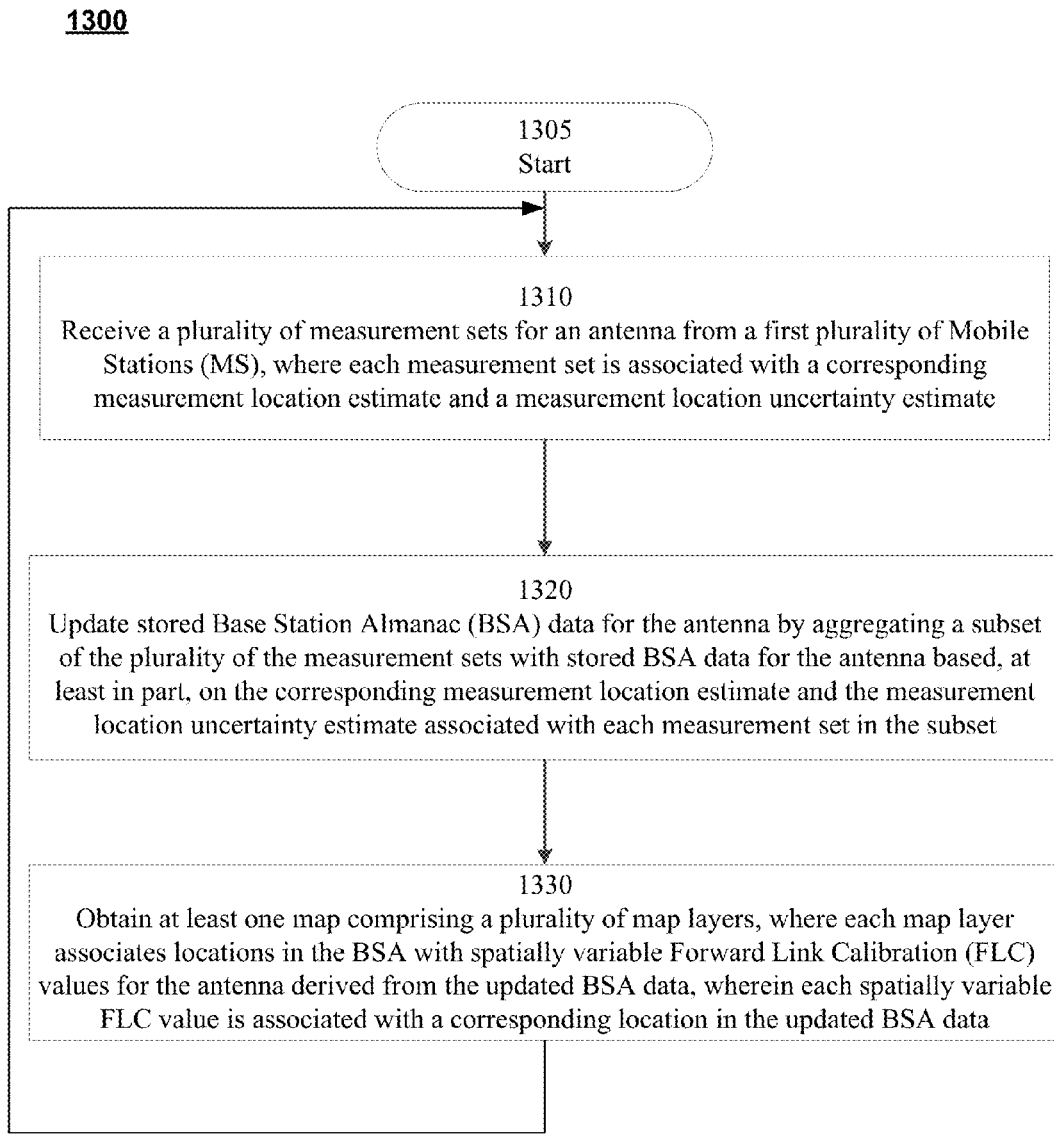
FIG. 13 shows a flowchart of an exemplary method for augmenting a BSA using crowdsourced measurements from MSs in a manner consistent with disclosed embodiments.

FIG. 13 shows a flowchart of an exemplary method 1300 for aggregating and/or augmenting a BSA using crowdsourced measurements from MSs in a manner consistent with disclosed embodiments. In some embodiments, method 1300 may be performed by server 150.

After starting in step 1305, in step 1310, a plurality of measurement sets for an antenna from a first plurality of Mobile Stations (MS) may be received, where each measurement set is associated with a corresponding measurement location estimate and a measurement location uncertainty estimate. In some embodiments, the measurement location and the measurement location uncertainty estimate corresponding to each measurement set may be obtained by one or more of: Global Navigation Satellite System (GNSS) signal measurements and/or hybrid measurements, the hybrid measurements based on a combination of GNSS measurements and one or more of terrestrial signal measurements or sensor based measurements.

Next, in step 1320, a stored Base Station Almanac (BSA) data for the antenna may be updated by aggregating a subset of the plurality of the measurement sets with stored BSA data for the antenna based, at least in part, on the corresponding measurement location estimate and the measurement location uncertainty estimate associated with each measurement set in the subset. In some embodiments, aggregating the subset of the plurality of the measurement sets with stored BSA data for the antenna may comprise: selecting a measurement set in the plurality of measurement sets as part of the subset, if the measurement location uncertainty estimate associated with the measurement set is below a threshold; establishing a correspondence between each measurement set in the subset and a location in the BSA data based, at least in part, on a proximity of the measurement location corresponding to the measurement set to the location in the BSA data; and aggregating each measurement set in the subset with stored BSA data for the corresponding location in the BSA data.

In step 1330, at least one map comprising a plurality of map layers may be obtained, where each map layer associates locations in the BSA with spatially variable Forward Link Calibration (FLC) values for the antenna derived from the updated BSA data, wherein each spatially variable FLC value is associated with a corresponding location in the updated BSA data. Another iteration may then begin in step 1310. In some embodiments, the spatially variable FLC values may be encoded based on at least one of: a curve fit of the input calibration data and associated coefficients; or Grid Encoding, or Cylindrical Harmonic Coefficients. In some embodiments, a subset of the plurality of map layers may form a hierarchy of map layers, wherein each map layer in the hierarchy has a corresponding position granularity and associates spatially variable FLC values for the antenna with locations in the BSA at the position granularity corresponding to that map layer. In some embodiments, a subset of the plurality of map layers obtained in step 1330 may be provided as assistance data to a second plurality of mobile stations.

In some embodiments, the plurality of map layers comprise at least one of: a received signal strength map layer, the received signal strength layer correlating a received signal strength with map locations, or a Signal to Noise Ratio (SNR) map layer, the SNR map layer correlating SNRs with map locations, or a Line of Sight (LOS) map layer, the LOS map layer indicating map locations where LOS conditions are likely with respect to one or more antennas, or a Non-Line of Sight map layer, the NLOS map layer indicating map locations where NLOS or body blocked conditions are likely with respect to one or more antennas.

In some embodiments, the plurality of map layers may comprise at least one multipath layer to provide an indication of the extent of multipath for the antenna for locations in the BSA. Further, the at least one multipath layer may comprise at least one of: a long shadow layer to indicate long shadow regions for the antenna, the long shadow layer comprising exclusion zones, an indication of the magnitude of multipath, and/or signal attenuation levels for the antenna in the long shadow regions; or a short shadow layer to indicate short shadow regions for the antenna, the short shadow layer comprising timing granularity information for antenna signals in the short shadow regions; or a transmitting pattern layer to indicate unique transmission patterns in at least one coverage area of the antenna.

Figure 14:
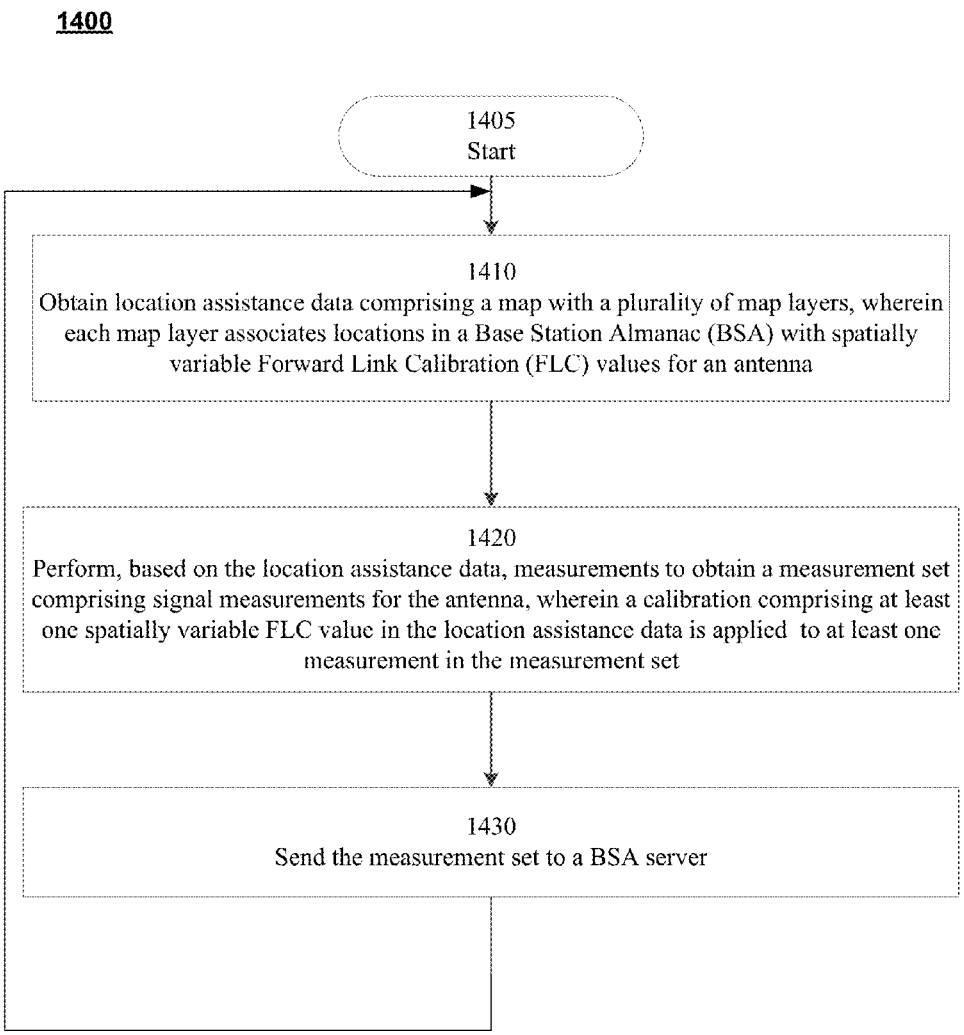
FIG. 14 shows a flowchart of an exemplary method for obtaining crowdsourced measurements from MS' in a manner consistent with disclosed embodiments.

FIG. 14 shows a flowchart of an exemplary method 1400 for obtaining crowdsourced measurements from MS' in a manner consistent with disclosed embodiments. In some embodiments, method 1400 may be performed by MS 120.

After starting in step 1405, in step 1410, location assistance data comprising a map with a plurality of map layers may be obtained by an MS, wherein each map layer associates locations in a Base Station Almanac (BSA) with spatially variable Forward Link Calibration (FLC) values for an antenna. In some embodiments, the location assistance data may be obtained by requesting, based on a location estimate and a location uncertainty estimate for a position of the MS, at least one map layer from a network entity.

Next, in step 1420, based on the location assistance data, measurements may be performed to obtain a measurement set comprising signal measurements for the antenna, wherein a calibration comprising at least one spatially variable FLC value in the location assistance data is applied to at least one measurement in the measurement set. In some embodiments, performing measurements to obtain the measurement set may comprise selecting a signal acquisition strategy based upon an expected accuracy specified in the at least one map layer and an a priori location estimate for the MS. In some embodiments, the a priori location estimate of the MS may be determined based, at least in part on, at least one of: a recent location of the MS; or bounding coverage area information for the antenna in the BSA, the bounding coverage area information comprising received signal strength information for the antenna; a Global Navigation Satellite System (GNSS) position fix; or a hybrid position fix obtained from a combination of GNSS and non-GNSS positioning sources, the non-GNSS sources comprising one or more of terrestrial transmitters or sensors; or a previously computed location of the MS.

In step 1430, the measurement set may be sent to a BSA server and another iteration may begin in step 1410. In some embodiments, the method may further comprise computing a refined location of the MS and a refined location uncertainty by applying the calibration to the measurement set, wherein the at least one spatially variable FLC value used for the calibration corresponds to an FLC value for the a priori position estimate. Further, in some embodiments, the MS may request, based on the refined location and the refined location uncertainty of the MS, at least one additional map layer as location assistance data, where the additional map layer may provide information at a granularity corresponding to the refined location and the refined location uncertainty.

Embodiments disclosed herein pertain to a method comprising: receiving a plurality of measurement sets for an antenna from a first plurality of Mobile Stations (MS), wherein each measurement set is associated with a corresponding measurement location estimate and a measurement location uncertainty estimate; updating stored Base Station Almanac (BSA) data for the antenna by aggregating a subset of the plurality of the measurement sets with stored BSA data for the antenna based, at least in part, on the corresponding measurement location estimate and the measurement location uncertainty estimate associated with each measurement set in the subset; and obtaining at least one map comprising a plurality of map layers, where each map layer associates locations in the BSA with spatially variable Forward Link Calibration (FLC) values for the antenna derived from the updated BSA data, wherein each spatially variable FLC value is associated with a corresponding location in the updated BSA data. In some embodiments, the method may further comprise, providing a subset of the plurality of map layers as assistance data to a second plurality of mobile stations. In some embodiments, the measurement location and the measurement location uncertainty estimate corresponding to each measurement set may be obtained by one or more of: Global Navigation Satellite System (GNSS) signal measurements; or hybrid measurements, the hybrid measurements based on a combination of GNSS measurements and one or more of terrestrial signal measurements or sensor based measurements.

In some embodiments, a subset of the plurality of map layers may form a hierarchy of map layers, wherein each map layer in the hierarchy has a corresponding position granularity and associates spatially variable FLC values for the antenna with locations in the BSA at the position granularity corresponding to that map layer. The plurality of map layers may comprise at least one of: a received signal strength map layer, the received signal strength layer correlating a received signal strength with map locations, or a Signal to Noise Ratio (SNR) map layer, the SNR map layer correlating SNRs with map locations, or a Line of Sight (LOS) map layer, the LOS map layer indicating map locations where LOS conditions are likely with respect to one or more antennas, or a Non-Line of Sight map layer, the NLOS map layer indicating map locations where NLOS or body blocked conditions are likely with respect to one or more antennas. Further, the plurality of map layers may comprise at least one multipath layer to provide an indication of the extent of multipath for the antenna for locations in the BSA, wherein the at least one multipath layer further comprises at least one of: a long shadow layer to indicate long shadow regions for the antenna, the long shadow layer comprising exclusion zones, an indication of the magnitude of multipath, and/or signal attenuation levels for the antenna in the long shadow regions; or a short shadow layer to indicate short shadow regions for the antenna, the short shadow layer comprising timing granularity information for antenna signals in the short shadow regions; or a transmitting pattern layer to indicate unique transmission patterns in at least one coverage area of the antenna.

In some embodiments of the above method, aggregating the subset of the plurality of the measurement sets with stored BSA data for the antenna may comprise: selecting a measurement set in the plurality of measurement sets as part of the subset, if the measurement location uncertainty estimate associated with the measurement set is below a threshold; establishing a correspondence between each measurement set in the subset and a location in the BSA data based, at least in part, on a proximity of the measurement location corresponding to the measurement set to the location in the BSA data; and aggregating each measurement set in the subset with stored BSA data for the corresponding location in the BSA data.

In some embodiments, the spatially variable FLC values may be encoded based on at least one of: a curve fit of the input calibration data and associated coefficients; or Grid Encoding, or Cylindrical Harmonic Coefficients.

Disclosed embodiments also pertain to a server comprising: a memory, the memory to store Base Station Almanac (BSA) data for an antenna; a communications interface, the communications interface to receive a plurality of measurement sets for an antenna from a first plurality of Mobile Stations (MS), wherein each measurement set is associated with a corresponding measurement location estimate and a measurement location uncertainty estimate; and a processor coupled to the memory and the communications interface wherein the processor is configured to: update Base Station Almanac (BSA) data for the antenna in the memory by aggregating a subset of the received plurality of the measurement sets with previously stored BSA data for the antenna based, at least in part, on the corresponding measurement location estimate and measurement location uncertainty estimate associated with each measurement set in the subset; and obtain at least one map comprising a plurality of map layers, where each map layer associates locations in the BSA with spatially variable Forward Link Calibration (FLC) values for the antenna derived from the updated BSA data, wherein each spatially variable FLC value is associated with a corresponding location in the updated BSA data. In some embodiments, the processor may be further configured to: provide a subset of the plurality of map layers as assistance data to a second plurality of mobile stations.

In some embodiments, to aggregate the subset of the plurality of the measurement sets with stored BSA data for the antenna, the processor may be further configured to: select a measurement set in the plurality of measurement sets as part of the subset, if the measurement location uncertainty estimate associated with the measurement set is below a threshold; establish a correspondence between each measurement set in the subset and a location in the BSA data based, at least in part, on a proximity of the measurement location corresponding to the measurement set to the location in the BSA data; and aggregate each measurement set with stored BSA data for the corresponding location in the BSA data. In some embodiments, a subset of the plurality of map layers may form a hierarchy of map layers, wherein each map layer has a corresponding position granularity and associates spatially variable FLC values for the antenna with locations in the BSA at the position granularity corresponding to that map layer.

Disclosed embodiments also pertain to a server comprising: storage means, the storage means to store Base Station Almanac (BSA) data for an antenna; communications interface means, the communications interface means comprising means for receiving a plurality of measurement sets for an antenna from a first plurality of Mobile Stations (MS), wherein each measurement set is associated with a corresponding measurement location and a measurement location uncertainty estimate; means for updating stored Base Station Almanac (BSA) data for the antenna, the means for updating further comprising means for aggregating a subset of the received plurality of the measurement sets with stored BSA data for the antenna based, at least in part, on the corresponding measurement location estimate and measurement location uncertainty estimate associated with each measurement set in the subset; and means for obtaining spatially variable Forward Link Calibration (FLC) values for the antenna derived from the updated BSA data, wherein each spatially variable FLC value is associated with a corresponding location in the BSA data. In some embodiments, the communications interface means may further provide a subset of the plurality of map layers as assistance data to a second plurality of mobile stations.

In some embodiments, the means for aggregating the subset of the plurality of the measurement sets with stored BSA data for the antenna further comprises: means for selecting a measurement set in the plurality of measurement sets as part of the subset, if the measurement location uncertainty estimate associated with the measurement set is below a threshold; means for establishing a correspondence between each measurement set in the subset and a location in the BSA data based, at least in part, on a proximity of the measurement location corresponding to the measurement set to the location in the BSA data; and means for aggregating each measurement set with stored BSA data for the corresponding location in the BSA data.

Further, disclosed embodiments also pertain to a computer-readable medium comprising instructions, which, when executed by a processor, perform steps in a method, the steps comprising: receiving a plurality of measurement sets for an antenna from a first plurality of Mobile Stations (MS), wherein each measurement set is associated with a corresponding measurement location estimate and a measurement location uncertainty estimate; updating stored Base Station Almanac (BSA) data for the antenna by aggregating a subset of the plurality of the measurement sets with stored BSA data for the antenna based, at least in part, on the corresponding measurement location estimate and the measurement location uncertainty estimate associated with each measurement set in the subset; and obtaining at least one map comprising a plurality of map layers, where each map layer associates locations in the BSA with spatially variable Forward Link Calibration (FLC) values for the antenna derived from the updated BSA data, wherein each spatially variable FLC value is associated with a corresponding location in the updated BSA data. In some embodiments, the computer-readable medium may further comprise instructions for providing a subset of the plurality of map layers as assistance data to a second plurality of mobile stations.

In some embodiments, the computer-readable medium may further comprise instructions for aggregating the subset of the plurality of the measurement sets with stored BSA data for the antenna may comprise: selecting a measurement set in the plurality of measurement sets as part of the subset, if the measurement location uncertainty estimate associated with the measurement set is below a threshold; establishing a correspondence between each measurement set in the subset and a location in the BSA data based, at least in part, on a proximity of the measurement location corresponding to the measurement set to the location in the BSA data; and aggregating each measurement set in the subset with stored BSA data for the corresponding location in the BSA data.

The methodologies described herein in flow charts and message flows may be implemented by various means depending upon the application. For example, these methodologies may be implemented in hardware, firmware, software, or any combination thereof. For a hardware implementation, the processing unit 1252 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

Although the disclosure is illustrated in connection with specific embodiments for instructional purposes, the disclosure is not limited thereto. Various adaptations and modifications may be made without departing from the scope Therefore, the spirit and scope of the appended claims should not be limited to the foregoing description.

What is claimed is:

1. A method on a Mobile Station (MS) comprising:
obtaining location assistance data comprising a map, the map comprising a plurality of map layers, the plurality of map layers comprising one or more Forward Link Calibration (FLC) map layers, wherein each FLC map layer associates a plurality of entries in a Base Station Almanac (BSA) with corresponding spatially variable Forward Link Calibration (FLC) values for signals transmitted by one or more antennas;
performing, based on the location assistance data, measurements to obtain measurement sets comprising signal measurements for a subset of the one or more antennas, wherein each measurement set corresponds to an antenna in the subset of the one or more antennas;
determining calibrated measurements by applying, based on the location assistance data, a calibration comprising at least one spatially variable FLC value corresponding to a first position estimate of the MS to each measurement in at least one measurement set; and
determining a second position estimate of the MS and a corresponding position uncertainty based, in part, on the calibrated measurements in the at least one measurement set.

2. The method of claim 1, further comprising:
determining based, in part, on the second position estimate:
one or more refined position estimates of the MS, and
one or more corresponding refined position uncertainties of the MS,
wherein each of the one or more corresponding refined position uncertainties is associated with a distinct refined position estimate in the one or more refined position estimates.

3. The method of claim 2, wherein, determining each of the one or more refined position estimates comprises:
obtaining, based on a current position estimate of the MS and a corresponding current position uncertainty of the MS, a corresponding refined spatially variable FLC value from a corresponding FLC map layer;
determining refined calibrated measurements by applying a calibration comprising the corresponding refined spatially variable FLC value to each measurement in the at least one measurement set; and
determining a corresponding refined position estimate of the MS and a corresponding current refined position uncertainty, based, in part, on the refined calibrated measurements in the at least one measurement set.

4. The method of claim 3, wherein, obtaining the corresponding refined spatially variable FLC value comprises:
obtaining the corresponding FLC map layer at a granularity corresponding to the current position estimate and the corresponding current position uncertainty.

5. The method of claim 1, further comprising:
initiating transmission of the at least one measurement set to a network entity.

6. The method of claim 1, wherein:
the plurality of map layers further comprise a plurality of multipath map layers, wherein each multipath map layer provides an indication of signal delays due to multipath from the subset of the one or more antennas for entries in the BSA, and wherein each multipath layer comprises exclusion zones indicative of long shadow regions.

7. The method of claim 6, wherein:
each multipath map layer further comprises statistical parameters associated with signal delays due to multipath for entries in the BSA.

8. The method of claim 6, wherein each multipath map layer further comprises signal attenuation levels for the subset of the one or more antennas.

9. The method of claim 6, wherein at least one FLC map layer and at least one multipath map layer include overlapping regions, the overlapping regions including locations corresponding to the first position estimate of the MS and the second position estimate of the MS.

10. The method of claim 6, wherein the plurality of multipath map layers further comprise at least one of:
a short shadow map layer to indicate short shadow regions for the subset of the one or more antennas, the short shadow layer further to provide an indication absolute signal power information and signal delays due to multipath for the subset of the one or more antennas for entries in the BSA; or
a transmitting pattern map layer to indicate, for each antenna in the subset of the one or more antennas, corresponding unique transmission patterns.

11. A Mobile Station (MS) comprising:
a memory,
a processor coupled to the memory, wherein the processor is configured to:
obtain location assistance data comprising a map, the map comprising a plurality of map layers, the plurality of map layers comprising one or more Forward Link Calibration (FLC) map layers, wherein each FLC map layer associates a plurality of entries in a Base Station Almanac (BSA) with corresponding spatially variable Forward Link Calibration (FLC) values for signals transmitted by one or more antennas;
perform, based on the location assistance data, measurements to obtain measurement sets comprising signal measurements for a subset of the one or more antennas, wherein each measurement set corresponds to an antenna in the subset of the one or more antennas;
determine calibrated measurements by applying, based on the location assistance data, a calibration comprising at least one spatially variable FLC value corresponding to a first position estimate of the MS to each measurement in at least one measurement set; and
determine a second position estimate of the MS and a corresponding position uncertainty based, in part, on the calibrated measurements in the at least one measurement set.

12. The MS of claim 11, wherein the processor is further configured to:
refine the second position estimate to obtain:
one or more refined position estimates of the MS, and
one or more corresponding refined position uncertainties of the MS, wherein each of the one or more corresponding refined position uncertainties is associated with a distinct refined position estimate of the one or more refined position estimates.

13. The MS of claim 12, wherein, to determining each of the one or more refined position estimates, the processor is configured to
obtain, based on a current position estimate of the MS and a corresponding current position uncertainty of the MS, a corresponding refined spatially variable FLC value from a corresponding FLC map layer;
determine refined calibrated measurements by applying a calibration comprising the corresponding refined spatially variable FLC value to each measurement in the at least one measurement set; and
determine a corresponding refined position estimate of the MS and a corresponding current refined position uncertainty of the MS, based, in part, on the refined calibrated measurements in the at least one measurement set.

14. The MS of claim 13, wherein, to obtain the corresponding refined spatially variable FLC value, the processor is configured to:
obtain the corresponding FLC map layer at a granularity corresponding to the current position estimate and the corresponding current position uncertainty.

15. The MS of claim 11, further comprising:
a transceiver coupled to the processor, wherein, the transceiver is configured to transmit the at least one measurement set to a network entity.

16. The MS of claim 11, wherein:
the plurality of map layers further comprise a plurality of multipath map layers, wherein each multipath map layer provides an indication of signal delays due to multipath from the subset of the one or more antennas for entries in the BSA, and wherein each multipath map layer comprises exclusion zones indicative of long shadow regions.

17. The MS of claim 16, wherein:
each multipath map layer further comprises statistical parameters associated with signal delays due to multipath for entries in the BSA.

18. The MS of claim 16, wherein each multipath map layer further comprises signal attenuation levels for the subset of the one or more antennas.

19. The MS of claim 16, wherein at least one FLC map layer and at least one multipath map layer include overlapping regions, the overlapping regions including locations corresponding to the first position estimate of the MS and the second position estimate of the MS.

20. The MS of claim 16, wherein the plurality of multipath map layers further comprise at least one of:
a short shadow map layer to indicate short shadow regions for the subset of the one or more antennas, the short shadow layer further to provide an indication absolute signal power information and signal delays due to multipath for the subset of the one or more antennas for entries in the BSA; or
a transmitting pattern map layer to indicate, for each antenna in the subset of the one or more antennas, corresponding unique transmission patterns.

21. A Mobile Station (MS) comprising:
means for obtaining location assistance data comprising a map, the map comprising a plurality of map layers, the plurality of map layers comprising one or more Forward Link Calibration (FLC) map layers, wherein each FLC map layer associates a plurality of entries in a Base Station Almanac (BSA) with corresponding spatially variable Forward Link Calibration (FLC) values for signals transmitted by one or more antennas;
means for performing, based on the location assistance data, measurements to obtain measurement sets comprising signal measurements for a subset of the one or more antennas, wherein each measurement set corresponds to an antenna in the subset of the one or more antennas;
means for determining calibrated measurements by applying, based on the location assistance data, a calibration comprising at least one spatially variable FLC value corresponding to a first position estimate of the MS to each measurement in at least one measurement set; and means for determining a second position estimate of the MS and a corresponding position uncertainty based, in part, on the calibrated measurements in the at least one measurement set.

22. The MS of claim 21, further comprising:

means for refining the second position estimate to obtain:
one or more refined position estimates of the MS, and
one or more corresponding refined position uncertainties of the MS, wherein each of the one or more corresponding refined position uncertainties is associated with a distinct refined position estimate in the one or more refined position estimates.

23. The MS of claim 21, wherein:
the plurality of map layers further comprise a plurality of multipath map layers, wherein each multipath map layer provides an indication of signal delays due to multipath from the subset of the one or more antennas for entries in the BSA, and wherein each multipath layer comprises exclusion zones indicative of long shadow regions.

24. The MS of claim 23, wherein:
each multipath map layer further comprises statistical parameters associated with signal delays due to multipath for entries in the BSA.

25. The MS of claim 23, wherein the plurality of multipath map layers further comprise at least one of:
a short shadow map layer to indicate short shadow regions for the subset of the one or more antennas, the short shadow layer further to provide an indication absolute signal power information and signal delays due to multipath for the subset of the one or more antennas for entries in the BSA; or
a transmitting pattern map layer to indicate, for each antenna in the subset of the one or more antennas, corresponding unique transmission patterns.

26. A non-transitory computer-readable medium comprising instructions that are executable by a processor to:
obtain location assistance data comprising a map, the map comprising a plurality of map layers, the plurality of map layers comprising one or more Forward Link Calibration (FLC) map layers, wherein each FLC map layer associates a plurality of entries in a Base Station Almanac (BSA) with corresponding spatially variable Forward Link Calibration (FLC) values for signals transmitted by one or more antennas;

perform, based on the location assistance data, measurements to obtain measurement sets comprising signal measurements for a subset of the one or more antennas, wherein each measurement set corresponds to an antenna in the subset of the one or more antennas;

determine calibrated measurements by applying, based on the location assistance data, a calibration comprising at least one spatially variable FLC value corresponding to a first position estimate of a mobile station (MS) to each measurement in at least one measurement set; and determine a second position estimate of the MS and a corresponding position uncertainty based, in part, on the calibrated measurements in the at least one measurement set.

27. The non-transitory computer-readable medium of claim 26, wherein the processor is further configured to:
refine the second position estimate to obtain:
one or more refined position estimates of the MS, and
one or more corresponding refined position uncertainties of the MS, wherein each of the one or more corresponding refined position uncertainties is associated with a distinct refined position estimate in the one or more refined position estimates.

28. The non-transitory computer-readable medium of claim 26, wherein:
the plurality of map layers further comprise a plurality of multipath map layers, wherein each multipath map layer provides an indication of signal delays due to multipath from the subset of the one or more antennas for entries in the BSA, and wherein each multipath layer comprises exclusion zones indicative of long shadow regions.

29. The non-transitory computer-readable medium of claim 28, wherein:
each multipath map layer further comprises statistical parameters associated with signal delays due to multipath for entries in the BSA.

30. The non-transitory computer-readable medium of claim 28, wherein the plurality of multipath map layers further comprise at least one of:
a short shadow map layer to indicate short shadow regions for the subset of the one or more antennas, the short shadow layer further to provide an indication absolute signal power information and signal delays due to multipath for the subset of the one or more antennas for entries in the BSA; or
a transmitting pattern map layer to indicate, for each antenna in the subset of the one
or more antennas, corresponding unique transmission patterns.

* * * * *